United States Patent
Nguyen et al.

(10) Patent No.: US 6,870,004 B1
(45) Date of Patent: Mar. 22, 2005

(54) METAL-LIGAND COMPLEXES AND RELATED METHODS OF CHEMICAL $CO_2$ FIXATION

(75) Inventors: SonBinh T. Nguyen, Evanston, IL (US); Robert L. Paddock, Evanston, IL (US); Jinhui Chen, Evanston, IL (US); Gregory J. Domski, Jr., Richmond, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 10/229,387

(22) Filed: Aug. 26, 2002

Related U.S. Application Data

(60) Provisional application No. 60/314,814, filed on Aug. 24, 2001.

(51) Int. Cl.[7] .............................................. C08L 53/00
(52) U.S. Cl. ........................................................ 525/88
(58) Field of Search ..................................... 525/92, 88

(56) References Cited

U.S. PATENT DOCUMENTS

| | | |
|---|---|---|
| 5,283,356 A | 2/1994 | Marquis et al. |
| 5,665,890 A | 9/1997 | Jacobsen et al. |
| 5,929,232 A | 7/1999 | Jacobsen et al. |
| 6,262,278 B1 * | 7/2001 | Jacobsen et al. ............ 549/230 |

FOREIGN PATENT DOCUMENTS

| GB | 2352449 | * | 1/2001 |

* cited by examiner

*Primary Examiner*—Rita Desai
*Assistant Examiner*—Robert Shiao
(74) *Attorney, Agent, or Firm*—Reinhart Boerner Van Deuren s.c.

(57) ABSTRACT

Salen complexes were found to be excellent catalysts for the reaction of terminal epoxides with $CO_2$ when used in conjunction with a Lewis base cocatalyst (DMAP). This catalyst system cleanly affords the product cyclic carbonates in high yield under mild reaction conditions and is applicable to a variety of terminal epoxides.

9 Claims, 21 Drawing Sheets

| Solvent | Solvent/PO ratio | TON |
|---|---|---|
| $CH_2Cl_2$ | 1/1 | 357 |
| Ether | 1/1 | 192 |
| Benzene | 1/1 | 152 |
| MeOH | 1/1 | 72 |
| Acetone | 1/1 | n/a |
| Neat | n/a | 376 |
| $CH_2Cl_2$ | 1/8 | 512 |

Reaction conditions: 1d (15 mg, 2.054 x $10^{-5}$ mol, 0.05 mol%), PO (3 mL, 4.29 x $10^{-2}$ mol), 0.5 mL $CH_2Cl_2$, 75 °C, $CO_2$ (9.3 atm).

| Temp (°C) | Time (h) | TON | TOF (h$^{-1}$) |
|---|---|---|---|
| 100 | 1.5 | 920 | 920 |
| 75 | 2 | 510 | 255 |
| 50 | 7 | 179 | 26 |
| rt | 14 | 39 | 3 |

Reaction conditions: [Cat] = 8.5 mmol; Cat/PO = 1/1500; CH$_2$Cl$_2$/PO (v/v) = 0.5mL/4mL; P CO$_2$ = 100 psi.

| Equiv. of DMAP | TON |
|---|---|
| 0 | 0 |
| 0.5 | 302 |
| 1 | 340 |
| 1.5 | 416 |
| 2 | 458 |
| 4 | 40 |

Reaction conditions: [Cat] = 8.5 mmol; Cat/PO = 1/1500; $CH_2Cl_2$/PO (v/v) = 0.5mL/4mL; P $CO_2$ = 150 psi.

* was the most active backbone in cyclic carbonate production from terminal epoxides.

| X | TON | TOF |
|---|---|---|
| Cl | 790 | 263 |
| OAc | 740 | 247 |
| NO$_3$ | 680 | 227 |
| p-CH$_3$SO$_3$ | 528 | 176 |
| BF$_4$ | 480 | 160 |
| O$_4$Cl | 111 | 37 |
| CF$_3$SO$_3$ | 0 | 0 |
| SbF$_6$ | 833 | 277 |

Reaction conditions: cat 0.1 mol%, epoxide (2.5mL, 1000 equiv), DMAP (1 equiv), CH$_2$Cl$_2$ (0.5mL), CO$_2$ (550 psig).
SbF$_6$: yields polyepoxide with 9% carbonate linkages

| X | TON | TOF |
|---|---|---|
| Cl | 0 | 0 |
| OAc | 30 | 10 |
| O₄Cl | 65 | 21 |
| CF₃SO₃ | 400 | 133 |
| SbF₆ | 400 | 133 |

Reaction conditions: cat 0.25 mol%, epoxide (1.0 mL, 400 equiv), $CH_2Cl_2$ (0.5mL), $CO_2$ (550 psig).
$SbF_6$: after 5 min at r.t. reaction is done.

Reaction conditions: cat (15 mg, 0.066 mol%), epoxide (1500 equiv, 3.4mL), 0.5ml $CH_2Cl_2$, 100°C.

| Equiv DMAP | Time (h) | conversion | Ton | TOF | Mn | Mw | PDI |
|---|---|---|---|---|---|---|---|
| 0.5 | 2.5 | 30.3 | 454 | 181 | 6378 | 7702 | 1.21 |
| 1 | 2.5 | 45 | 670 | 265 | 7317 | 9479 | 1.3 |
| 2 | 2.5 | 49.4 | 741 | 296 | 8127 | 10277 | 1.26 |
| 3 | 2.5 | 48 | 720 | 288 | 5779 | 8057 | 1.39 |
| 5 | 2.5 | 60 | 901 | 360 | 5496 | 9257 | 1.68 |
| 10 | 2.5 | 53 | 796 | 318 | 4281 | 6540 | 1.53 |
| 3 | 3.5 | 64.5 | 747 | 276 | 6903 | 10283 | 1.49 |
| 5 | 4.66 | 77.8 | 1166 | 250 | 6002 | 9598 | 1.6 |

Reaction conditions: cat (15 mg, 0.066 mol%), epoxide (1500 equiv, 3.4mL), 0.5ml $CH_2Cl_2$, 100°C.

Reaction conditions: cat (15 mg, 0.066 mol%), epoxide (1500 equiv, 3.4mL), DMAP (1equiv), 0.5ml $CH_2Cl_2$, 100°C.

Reaction conditions: cat (15 mg, 0.066 mol%), epoxide (1500 equiv, 3.4mL), DMAP (1equiv), 0.5ml $CH_2Cl_2$, 100°C.

METAL-LIGAND COMPLEXES AND RELATED METHODS OF CHEMICAL CO$_2$ FIXATION

This application claims priority benefit of provisional application Ser. No. 60/314,814 filed Aug. 24, 2001, the entirety of which is incorporated herein by reference.

The United States government has certain rights to this invention, pursuant to Grant No. CHE-9810378 to Northwestern University from the National Science Foundation.

BACKGROUND OF THE INVENTION

Carbon dioxide is an attractive C$_1$ building block in organic synthesis as it is highly functional, abundant, inexpensive, non toxic, and non flammable. As petroleum reserves are depleted, the development of efficient catalytic processes employing CO$_2$ as a feedstock has become increasingly important as evidenced by the intense research in this area in recent years. However, due to CO$_2$'s inert nature, efficient catalytic processes for chemical fixation remain elusive. Thus, in addition to the practical merit, chemical CO$_2$ fixation remains a significant synthetic challenge. One of the most promising methodologies in this area has been the synthesis of cyclic carbonates via the metal-catalyzed coupling of CO$_2$ and epoxides (eq. 1). (See, Darensbourg, D. J.; Holtcamp, M. W. *Coord. Chem. Rev.* 1996, 153, 155–174.) Cyclic carbonates are valuable as monomers, aprotic polar solvents, pharmaceutical/fine chemical intermediates, and have found uses in many biomedical applications. In recent decades numerous catalyst systems have been developed for this transformation. (See, e.g., Darensbourg, supra; Ratzenhofer, M.; Kisch, H. Angew. *Chem., Int. Ed. Engl.* 1980, 19, 317–318; Kihara, N.; Hara, N.; Endo, T. *J. Org. Chem.* 1993, 58, 6198–6202; Kawanami, H.; Ikushima, Y. *Chem. Commun.* 2000, 2089–2090; Aida, T.; Inoue, S. *J. Am. Chem. Soc.* 1983, 105, 1304–1309; Baba, A.; Nozaki, T.; Matsuda, H. *Bull. Chem. Soc. Jpn.* 1987, 60, 1552–1554.) While the advances have been significant, all such systems suffer from either low catalyst stability/reactivity, air sensitivity, the need for co-solvent, and/or the requirement for high pressures and/or high temperatures. For example, a mixed-metal Mg/Al oxide is a reported catalyst system which operates at a reasonable CO$_2$ pressure (5 atm) but requires a substantial amount of solvent (85% v/v DMF) and takes 24 h at 100° C. to convert just 0.28 g of propylene oxide in 88% yield and 92% selectivity, even with a very high catalyst loading of 1.8 g catalyst/g of substrate. (See, Yamaguchi, K.; Ebitani, K.; Yoshida, T.; Yoshida, H.; Kaneda, K. *J. Am. Chem. Soc.* 1999, 121, 4526–4527.)

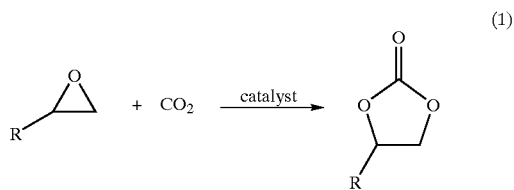

(1)

SUMMARY OF THE INVENTION

In light of the foregoing, it is an object of the present invention to provide one or more catalytic systems for fixation of carbon dioxide, thereby overcoming various shortcomings and deficiencies of the prior art. In part, the present invention includes a new highly active salen and/or Schiff base metal complex catalyst systems for the synthesis of cyclic carbonates and polycarbonates from the coupling of CO$_2$ and epoxides under extremely mild conditions. A Cr(III) porphyrin complex has previously been used in the prior art as a catalyst for the synthesis of cyclic carbonate. (See, Kruper, W. J.; Dellar, D. D. *J. Org. Chem.* 1995, 60, 725–727.) Changing the coordination environment around the Cr metal center from a porphyrin to a salen or Schiff base ligand offers several advantages: 1) both are easily and efficiently synthesized in stark contrast to porphyrins, which are typically obtained in yields of less then 20%; and 2) the modular construction from diamines and salicylaldehydes enables easy tuning of catalyst steric and electronic properties.

It can be another object of this invention to extend the methodology and use of salen and/or Schiff base complexes, as described herein, to other electrophilic addition or related reaction systems, including but not limited to the preparation of a wide range of cyclic carbonate and polycarbonate compositions.

As well known to those skilled in the art, cyclic carbonates have a wide range of use as structural platforms en route to a variety of synthetic intermediates or for end use applications. Accordingly, as an object of this invention the metal complexes described herein and/or various components of the associated catalytic systems can be used in conjunction with one or more methods relating to the preparation of such cyclic carbonates or polycarbinates.

While the various aspects of this invention are illustrated through the use of complexed chromium catalysts, it is an object of the present invention to extend the catalytic compositions, synthetic procedures and related methodologies to catalytic systems utilizing salen and/or Schiff base-complexed cobalt (Co), titanium (Ti), nickel (Ni), tin (Sn) and zinc (Zn) metals. Various other metal-centered complexes are described herein and are as would be known to those skilled in the art made aware of this invention. While such systems may not show optimal utility with respect to any one synthetic pathway, it can be a matter of routine experimentation to achieve desired catalytic activities, especially in the presence of a Lewis-base cocatalyst (vide infra). Accordingly, as described more fully below, in the accompanying figures, examples and descriptions, a related object of this invention includes complexes modified with various other ligand structures, the choice which as can be determined as desirable for a specific end use application.

Likewise, while preferred embodiments of this invention are described in conjunction with use of one or more cocatalysts, it is an object of this invention to provide various other cocatalytic components can be used with comparable effect.

Without limitation to any one metal center, ligand structure and/or catalytic system, it is another object of this invention to provide a facile route to such metal-ligand complexes, thereby enhancing the beneficial effect and advantages observed through their use and application.

It is another object of this invention, without limitation to any one metal center, ligand structure or catalytic system, to provide a number of unique synthetic transformations. For instance, and as described more fully below, the present invention provides for a method of preparing a mixture of chirally enhanced epoxides and chirally enhanced carbonates from achiral epoxides. Use of the catalyst systems of this invention affords several process-related benefits, including high selectivity and good yields under low temperature and pressures, with minimal solvent requirements.

Similar advantages can be realized in other synthetic contexts, including without limitation, the use of the present invention in the preparation of polycarbonate compositions.

Other objects, features, benefits, and advantages of the present invention will be apparent from this summary of the invention and its descriptions of various preferred embodiments, and will be readily apparent to those skilled in the art having knowledge of various catalytic systems and methods for their preparation and use. Such objects, features, benefits and advantages will be apparent from the above as taken in conjunction with the accompanying examples, data, figures, and all reasonable inferences to be drawn therefrom.

Accordingly and as described more fully below, the present invention is directed to a class of catalytic complexes, as can be used in a range of $CO_2$ fixation reactions. Such a complex can be represented as

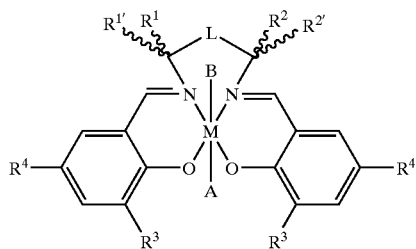

wherein $R^1$, $R^{1'}$, $R^2$, and $R^{2'}$, include but are not limited to hydrogen, methyl, alkyl, substituted alkyl, phenyl, aryl, substituted phenyl, substituted aryl, and combinations of said moieties;

wherein L is a linker moiety ($CR^5R^6$), where n=0–4 and $R^5$ and $R^6$ can be but are not limited to hydrogen, methyl, alkyl, substituted alkyl, phenyl, aryl, substituted phenyl, substituted aryl and combinations of said moieties;

wherein A and B are ligands such as neutral ligands, anionic ligands and a combination thereof, as determined by the oxidation state of M;

wherein $R^3$ includes but is not limited to hydrogen, alkyl, substituted alkyl, phenyl, aryl, substituted phenyl, substituted aryl, alkoxy, halide and nitro moieties; and wherein $R^4$ includes but is not limited to hydrogen, alkyl, substituted alkyl, phenyl, aryl, substituted phenyl, substituted aryl, alkoxy, halide and nitro moieties; and wherein M is a metal including but not limited to Co, Cr, Fe, Ni, Ti, Cu, Zn, Sn and Al. In various preferred embodiments, depending on desired reaction, M can be Co, Cr or Sn.

Likewise, depending on a particular complex and/or reaction system, a Lewis base can be utilized as a co-catalyst, such components including but not limited to a range of phosphines, phosphine oxides, phosphites, amines, amine-N-oxides, imidazoles, pyridines, pyridine-N-oxides, ethers, and thioethers. Especially useful are heterocyclic components with electron releasing groups. The carbon dioxide coupling/fixation methods of this invention can be effected over a range of substrates such as ethylene oxide, propylene oxide, hexene oxide, styrene oxide, epichlorohydrin, butadiene monoxide, $C_5$–$C_6$ cycloalkene oxide, and various other terminal epoxides. Choice of substrate complex, base and reaction conditions can be used effectively en route to cyclic or polycarbonate production.

Alternatively, this invention can be directed to metal-bidentate chelate and/or ligand complex compositions represented by the structural formula

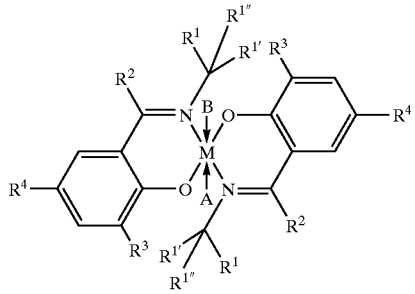

wherein A and B are ligands such as neutral ligands, anionic ligands and a combination thereof, said selection determined by the oxidation state of M;

wherein $R^1$, $R^{1'}$, $R^{1''}$ can be but are not limited to hydrogen, alkyl, substituted alkyl, phenyl, aryl, substituted phenyl, substituted aryl, alkoxy, halide and nitro moieties;

wherein $R^2$ can be but is not limited to hydrogen, alkyl, substituted alkyl, phenyl, aryl, substituted phenyl, and substituted aryl moieties;

wherein $R^3$ can be but is not limited to hydrogen, alkyl, substituted alkyl, alkoxy, phenyl, substituted phenyl, aryl and substituted aryl moieties;

wherein $R^4$ can be but is not limited to hydrogen, alkyl, substituted alkyl, alkoxy, phenyl, substituted phenyl, aryl and substituted aryl moieties; and wherein M is a metal such as Co, Cr, Fe, Ni, Ti, Cu, Zn, Sn and Al. Likewise, as discussed above, a Lewis base can be used therewith, such components including but not limited to phosphines, phosphine oxides, phosphites, amines, amine-N-oxides, imidazoles, pyridines, pyridine-N-oxides, ethers, and thioethers.

DETAILED DESCRIPTION OF SEVERAL PREFERRED EMBODIMENTS

I. Cyclic Carbonates Via $CO_2$ Fixation

Figure 1:
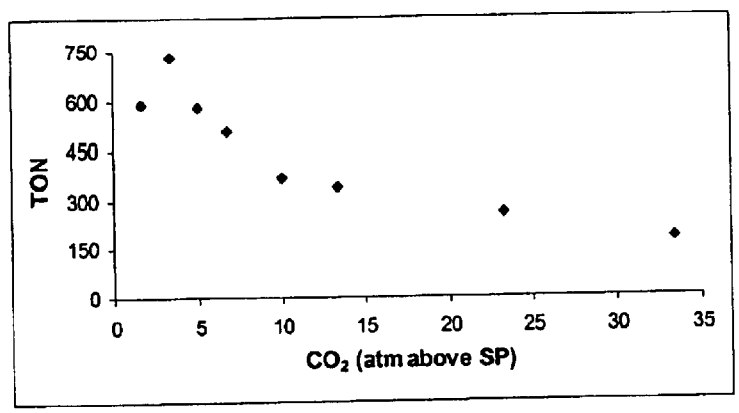
FIG. 1. Turnover Number (TON) as a function of $CO_2$ pressure, in the preparation of propylene carbonate, using complex 1d in accordance with this invention.

Without limitation, and as representative of various other embodiments of this invention, preliminary efforts relating to this invention showed that composition 1a, below, successfully catalyzes the coupling of $CO_2$ and propylene oxide (PO) in the presence of a Lewis-basic cocatalyst such as dimethylamino pyridine (DMAP). No reaction was observed in the absence of DMAP, which is consistent with that observed for the Cr porphyrin-catalyzed reaction. Reaction (2) was run in 1:1 (v/v) mixtures of PO and various co-solvents; however running the reaction in neat PO gave the best yield of propylene carbonate (PC). This yield could be increased further by the addition of a small amount of $CH_2Cl_2$, presumably to help solubilize the catalyst system (Table 1, Entries 4–5).

Several Cr(III) salen complexes (1a–d) with varying diamine backbones were investigated as catalysts for reaction 2. Cr(III) salen complex 1d, exhibited the highest catalytic activity of all the catalysts and is at least twice as active as the racemic trans analog 1c (Table 1 entries 1–4), a result that may be due to the more accessible coordination site available in complex 1d. The trans-cyclohexyl salen catalyst 1a and the propylene salen catalysts 1b are also slightly more active than 1c. Complex 1d was then employed to further investigate and optimize the effects of the various reaction parameters on propylene carbonate production.

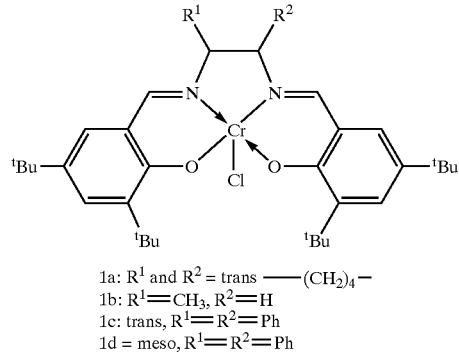

1a: $R^1$ and $R^2$ = trans —(CH$_2$)$_4$—
1b: $R^1$=CH$_3$, $R^2$=H
1c: trans, $R^1$=$R^2$=Ph
1d = meso, $R^1$=$R^2$=Ph

TABLE 1

The Effect of Reaction Parameters on the Coupling of $CO_2$ and PO Catalyzed by Complexes 1a–d.

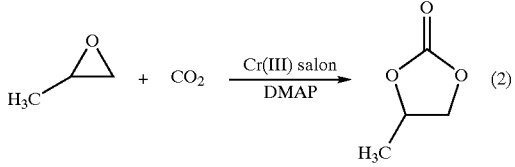

| Entry | Catalyst | DMAP equiv | $CO_2$ (psi) | Temp (° C.) | Time (h) | Total TON[a] | TOF[c] (h$^{-1}$) |
|---|---|---|---|---|---|---|---|
| 1 | 1a | 1 | 100 | 75 | 2 | 323 | 162 |
| 2 | 1b | 1 | 100 | 75 | 2 | 338 | 169 |
| 3 | 1c | 1 | 100 | 75 | 2 | 253 | 127 |
| 4 | 1d | 1 | 100 | 75 | 2 | 507 | 254 |
| 5[b] | 1d | 1 | 100 | 75 | 2 | 386 | 193 |
| 6 | None | 1 | 150 | 75 | 2 | 0 | 0 |
| 7 | 1d | 0 | 150 | 75 | 2 | 0 | 0 |
| 8 | 1d | 0.5 | 150 | 75 | 2 | 302 | 151 |
| 9 | 1d | 1 | 150 | 75 | 2 | 340 | 170 |
| 10 | 1d | 2 | 150 | 75 | 2 | 458 | 229 |
| 11 | 1d | 4 | 150 | 75 | 2 | 30 | 15 |
| 12 | 1d | 1 | 100 | 25 | 14 | 39 | 3 |
| 13 | 1d | 1 | 100 | 50 | 7 | 179 | 26 |
| 14 | 1d | 1 | 100 | 100 | 1 | 916 | 916 |

Reaction Conditions: PO (4 mL, 3.32 g, 5.72 × 10$^{-2}$ mol), $CH_2Cl_2$ (0.5 mL), catalyst (0.075 mol %).
[a]Moles of propylene carbonate produced per mole of catalyst.
[b]Reaction carried out in neat PO (4 mL).
[c]Moles of propylene carbonate produced per mole of catalyst per hour.

The ratio of DMAP to complex 1d had a significant effect on the turnover frequency (TOF) (Table 1, entries 6–11). The TOF increased as the number of equiv of DMAP increased, up to two equiv. Increasing the DMAP concentration any further resulted in a loss of activity to the point where the reaction was almost completely shut down when 4 equiv of DMAP were used. It is also important to note that DMAP by itself did not catalyze the reaction (Table 1, entry 7).

Figure 2:
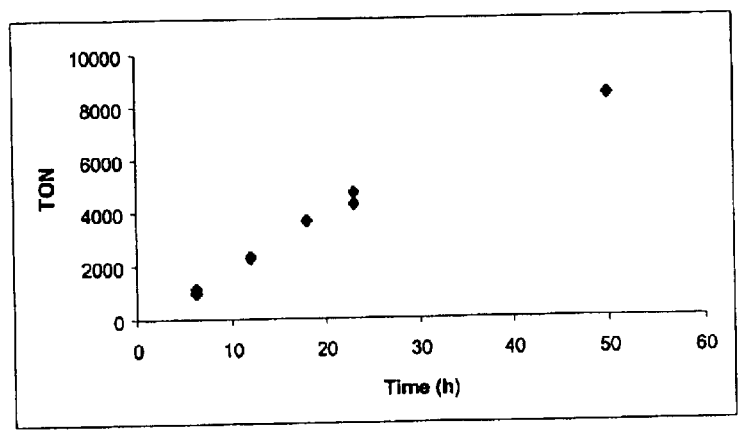
FIG. 2. TON as a function of time, further in accordance with this invention, in the preparation of propylene carbonate using complex 1d.

A significant drawback in the prior art associated with using $CO_2$ as a reagent in organic synthesis is the potential expenses and dangers associated with operating at high temperatures and pressures. However, the catalyst system of this invention can operate very efficiently at low $CO_2$ pressures and temperatures. The highest catalytic activity occurs at only 3.3 atm above ambient pressure (SP), and is maintained at 80% of this optimum TOF at only 1.5 atm above SP (FIG. 1). Increasing the pressure beyond the optimal level resulted in a dramatic decrease in activity, which as currently known is the only instance in chemical $CO_2$ fixation where an increase in $CO_2$ pressure causes a decrease in TOF. (Reference is made to the procedure of example 3, below. Varying pressures of $CO_2$ provide the data of FIG. 1.) Increasing the temperature reaction 2 had a pronounced positive effect on the TOF (Table 1, entries 4 and 12–14). However, the coupling of PO with $CO_2$ could be carried out at a reasonable rate at ambient temperature. The catalyst system exhibits remarkable longevity. The activity does not deteriorate over a period of 50 h, attaining over 8000 turnovers (FIG. 2). (Reaction conditions: complex 1d (4.2 mg, $5.75 \times 10^{-6}$ mol), DMAP (0.7 mg, $5.75 \times 10^{-6}$ mol), PO (4 mL, $5.72 \times 10^{-3}$ mol), 0.5 mL $CH_2Cl_2$, 75° C., $CO_2$ (3.3 atm)).

The (salen) Cr(III) catalyst system was found to be applicable to a variety of terminal epoxides, providing the corresponding cyclic carbonates in near quantitative yield and 100% selectivity (Table 2). Both aromatic and aliphatic epoxides are good substrates for reaction 1. Epichlorohydrin was found to be the most reactive epoxide, while vinyl epoxide exhibited the lowest activity of the epoxides surveyed.

Cr(III) salen complexes are highly efficient catalysts in the coupling of carbon dioxide with epoxides at mild temperatures and pressures. They represent an air stable, easily synthesized, extremely robust catalyst system which requires no solvent and tolerates multiple substrates. These characteristics make them ideal catalysts for chemical $CO_2$ fixation and provided the impetus to investigate other metal, ligand and/or cocatalytic systems.

TABLE 2

The Coupling of $CO_2$ and Various Epoxides Catalyzed by Complex 1d.[a]

| substrate | temp | time | product | yield[b] |
|---|---|---|---|---|
| propylene oxide (H₃C-epoxide) | 75 | 1.5 | 4-methyl-1,3-dioxolan-2-one | 100% |
| epichlorohydrin (Cl-CH₂-epoxide) | 76 | 1.5[c] | 4-(chloromethyl)-1,3-dioxolan-2-one | 98% |
| butadiene monoxide (vinyl epoxide) | 85 | 7.5 | 4-vinyl-1,3-dioxolan-2-one | 94% |
| 1,2-epoxyoctane (H₃C-(CH₂)₅-epoxide) | 85 | 3.5 | 4-hexyl-1,3-dioxolan-2-one | 100% |
| 1,2-epoxy-3-phenylpropane (benzyl epoxide) | 75 | 8.5 | 4-benzyl-1,3-dioxolan-2-one | 100% |
| styrene oxide | 85 | 7 | 4-phenyl-1,3-dioxolan-2-one | 99% |
|  | 75 | 12[c] |  | 99% |

[a]Reaction conditions; reference is made to the procedure of example 3, below: 1d (27.8 mg, $3.81 \times 10^{-5}$ mol), DMAP (4.6 mg, $3.81 \times 10^{-5}$ mol), epoxide ($3.81 \times 10^{-3}$ mol), $CO_2$ (3.3 atm), 0.5 mL $CH_2Cl_2$.
[b]Yields were determined by comparing the ratio of product to substrate in the $^1$H NMR of an aliquot of the reaction mixture.
[c]Reaction ran in neat epoxide.

Various other aspects of this invention, as can be illustrated with representative use of a Cr(III) catalyst system are illustrated in the examples which follow, in particular examples 1–13.

II. Sn Complexes and $CO_2$ Fixation

In light of the preceding, salen-type tin(II) complexes with various backbone were also contemplated and synthesized in good yields via the direct reaction of salen-type ligands and $SnCl_2$. These (salen)tin(II) complexes can be oxidized to (salen)tin(IV) complexes $LSnX_2$ (L=salen-type ligand; X=Br and I) with $Br_2$ or $I_2$. Anion-exchange reaction between $LSnX_2$ with AgOTf allows the synthesis of LSn $(OTf)_2$ in quantitative yields (OTf = trifluoromethanesulfonate). Complexes of the type LSn $(OTf)_2$ are excellent precursors to $LSnCl_2$ and $LSn(Br)$ (OTf). (See, examples 14–23, below.)

Although there has been several reports on the preparation of tin(II) and tin(IV) salen complexes, the generality of many of these syntheses have not been demonstrated for a wide range of salen ligand backbones, especially for those that are very soluble in organic solvent (vide infra). In addition, for $(salen)Sn^{IV}$ complexes the choice of anionic ancillary ligands is often limited to chloride alone. Further, several of the literature syntheses employed inconvenient precursors and are plagued with separation problems during product isolation (vide infra). To these ends, we aimed to develop a convenient and general method to efficiently access (salen)Sn complexes with a wide range of ligand environments in both the II and IV oxidation states.

The (salen)tin(II) compounds 2a–e (and cpds. 2f–m, in Table 3a) can be obtained in moderate to good yields (50–93%) by combining stoichiometric amounts of the salen ligand and $SnCl_2$ in absolute ethanol in a closed system containing two equivalents of $Et_3N$ as a base (eq 3). In this way, we can overcome the decomposition of the desired (salen)Sn(II) product that occurs under refluxing conditions. (Salen)Sn(II) compounds 2a–e are very air sensitive in solution but are stable in solid state. They can be decomposed by water in a stepwise process to give the bis-ligand complex $(salenH)_2Sn$ and then $Sn(OH)_2$. Under non-anhydrous conditions, THF solution of compound 2a slowly changes color from orange to pale yellow-green together with the formation of $Sn(OH)_2$ as a white precipitate. From the resulting solution a pale yellow-green solid can be isolated and shown to be the bis-ligand complex (salenH) $_2Sn$ (2a) by both $^1H$ NMR and FABMS. Further exposure of 2a to non-anhydrous condition gives $Sn(OH)_2$ and $salenH_2$ ligand.

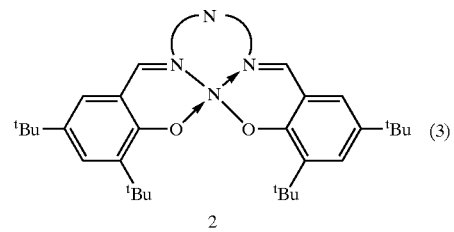

a: R = 1,2-ethanediyl
b: R = 1-methyl-1,2-ethanediyl
c: R = 1,3-benzenediyl
d: R = (R,R)-(-)-1,2-cyclohexanediyl
e: R = (S,S)-(+)-1,2-cyclohexanediyl $(Salen)Sn^{IV}$ complexes have been prepared by direct reaction of $SnX_4$ with $salenH_2$ either with or without a base or by transmetallation. We obtained the $(salen)Sn^{IV}Cl_2$ complexes 3a and 3e in low yield (15–20%) by directly adding $SnCL_4$ to a $CH_2Cl_2$ solution of the salen ligand (eq 4). Alternatively, 3a and 3e can be synthesized in good yield (90% and 87%) from $(salen)Sn^{IV}(OTf)_2$ (vide infra) and excess NaCl (eq 6). In contrast, the $(salen)Sn^{IV}Br_2$ complexes, 4a–e, and $(salen)Sn^{IV}I_2$ complexes, 5a–e, were easily obtained in high yields (~90%) from the oxidation of the corresponding $(salen)Sn^{II}$ compounds with bromine and iodine, respectively, at room temperature (eq 5). Complexes 5a–e can also be prepared from either $(salen)Sn^{IV}(OTf)_2$ or $(salen)Sn^{IV}Br_2$ with excess NaI (eq 6). The $(salen)Sn^{IV}$ $(OTf)_2$ complexes can be prepared from either the corresponding $(salen)Sn^{IV}I_2$ or $(salen)Sn^{IV}Br_2$ complexes by combining these starting materials with two equiv of AgOTf at room temperature (eq 5). The mixed-ligand $(salen)Sn^{IV}$ (Br)(OTf) complex 7a was also successfully obtained from $(salen)Sn^{IV}Br_2$ (2a) and one equiv of AgOTf at room temperature. However, this method was unsuccessful when applied to complex 2e to make the putative cyclohexyl-backbone complex 7e.

Together, these results suggest that the $(salen)Sn^{IV}I_2$ complexes are thermodynamically the most stable within the homologous series of (salen)Sn(IV) species. Further, the triflate ligands of $(salen)Sn^{IV}(OTf)_2$ complexes are quite labile, making them useful as precursors for various (salen) $Sn^{IV}X_2$ complexes.

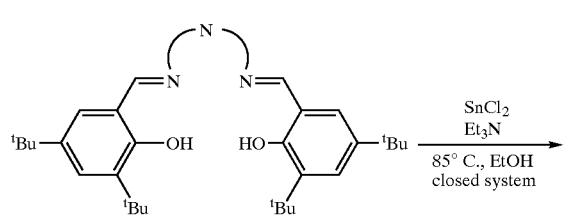

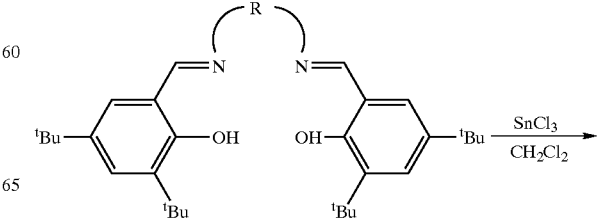

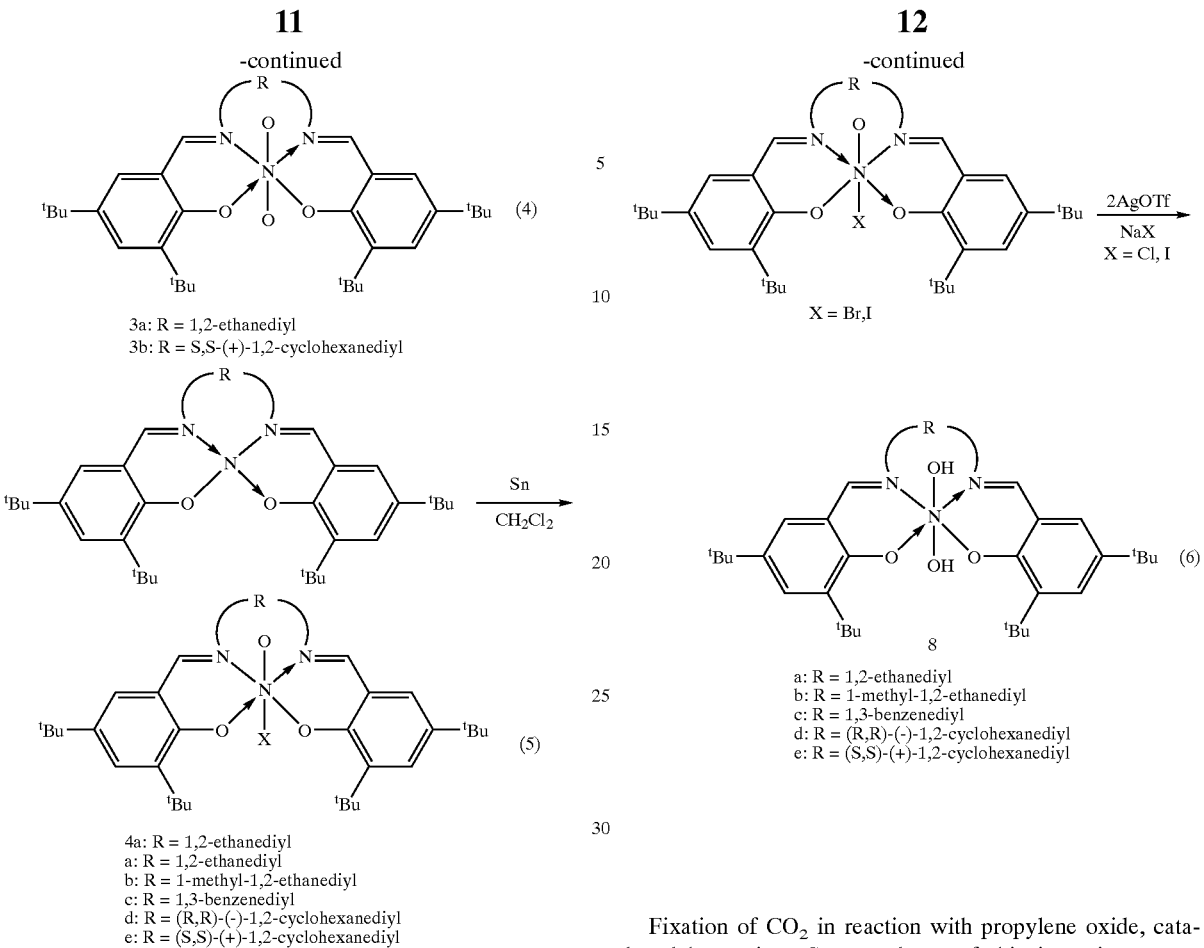
Fixation of $CO_2$ in reaction with propylene oxide, catalyzed by various Sn complexes of this invention are as summaried in Tables 3a–e, below.
TABLE 3a
|  | Sn(II) | Sn(IV) Cl$_2$ | Sn(IV) Br$_2$ | Sn(IV) I$_2$ | Sn(IV) OTf$_2$ | Sn(IV) BrOTf |
|---|---|---|---|---|---|---|
|  | 2a | 3b | 4a | 5a | 6a | 7a |
|  | 2b |  | 4b | 5b | 6b |  |

TABLE 3a-continued

| | Sn(II) | Sn(IV) Cl₂ | Sn(IV) Br₂ | Sn(IV) I₂ | Sn(IV) OTf₂ | Sn(IV) BrOTf |
|---|---|---|---|---|---|---|
| [structure c] | 2c | | 4c | 5c | 6c | |
| [structure d] | 2d | | 4d | 5d | 6d | |
| [structure e] | 2e | 3e | 4e | 5e | 6e | |
| [structure f] | 2f | | 4f | | | |
| [structure g] | 2g | | 4g | | | |
| [structure h] | 2h | | 4h | | | |

TABLE 3a-continued

| | Sn(II) | Sn(IV) Cl₂ | Sn(IV) Br₂ | Sn(IV) I₂ | Sn(IV) OTf₂ | Sn(IV) BrOTf |
|---|---|---|---|---|---|---|
| 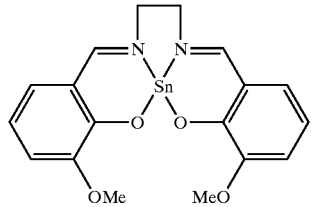 | 2i | | 4i | | | |
| 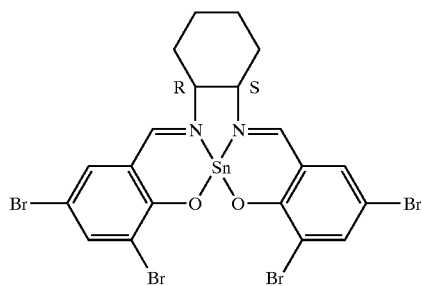 | 2j | | 4j | | | |
| 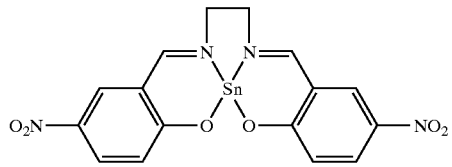 | 2k | | 4k | | | |
| 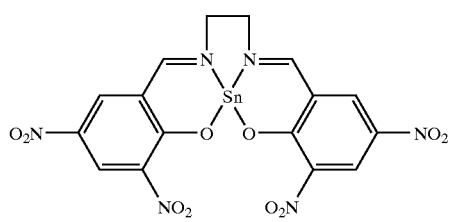 | 2l | | 4l | | | |
| 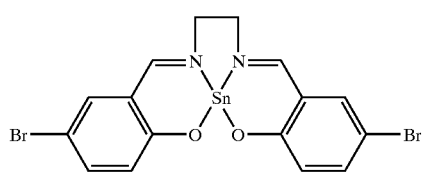 | 2m | | 4m | | | |

TABLE 3b (N,N'-bis(3,5-di-tert-butylsalicylidene)-1,2-ethanediamino)tin(II) (2a)
(N,N'-bis(3,5-di-tert-butylsalicylidene)-1-methyl-1,2-ethylenediamino)tin-(II) (2b)
(N,N'-bis(3,5-tert-butylsalicylidene)-1,2-benzenediamino)tin(II) (2c)
(N,N'-bis(3,5-di-tert-butylsalicylidene)-(R,R)-(−)-1,2-cyclohexanediamino)tin(II) (2d)
(N,N'-bis(3,5-di-tert-butylsalicylidene)-(S,S)-(+)-1,2-cyclohexanediamino)tin(II) (2e)
(N,N'-bis(3,5-di-tert-butylsalicylidene)-1,2-ethane-diamino)tin(IV) dichloride (3a)
(N,N'-bis(3,5-di-tert-butylsalicylidene)-(S,S)-(+)-1,2-cyclohexanediamino)tin(IV) dichloride (3e)
(N,N'-bis(3,5-di-tert-butylsalicylidene)-1,2-ethanediamino)tin(IV) dibromide (4a)
(N,N'-bis(3,5-di-tert-butylsalicylidene)-1-methyl-1,2-ethylenediamino)-tin(IV) dibromide (4b)

TABLE 3b-continued (N,N'-bis(3,5-tert-butylsalicylidene)-1,2-benzenediamino)tin(IV) dibromide (4c)
(N,N'-bis(3,5-di-tert-butylsalicylidene)-(R,R)-(−)-1,2-cyclohexanediamino)tin(IV) dibromide (4d)
(N,N'-bis(3,5-di-tert-butylsalicylidene)-(S,S)-(+)-1,2-cyclohexanediamino)tin(IV) dibromide (4e)
(N,N'-bis(3,5-di-tert-butylsalicylidene)-1,2-ethanediamino)tin(IV) diiodide (5a)
(N,N'-bis(3,5-di-tert-butylsalicylidene)-1-methyl-1,2-ethylenediamino)tin-(IV) diiodide (5b)
(N,N'-bis(3,5-tert-butylsalicylidene)-1,2-benzenediamino)tin(IV) diiodide (5c)
(N,N'-bis(3,5-di-tert-butylsalicylidene)-(R,R)-(−)-1,2-cyclohexanediamino)tin(IV) diiodide (5d)
(N,N'-bis(3,5-di-tert-butylsalicylidene)-(S,S)-(+)-1,2-cyclohexanediamino)tin(IV) diiodide (5e)

TABLE 3b-continued (N,N'-bis(3,5-di-tert-butylsalicylidene)-1,2-ethanediamino)tin(IV) bis-(triflate) (6a)
(N,N'-bis(3,5-di-tert-butylsalicylidene)-1-methyl-1,2-ethylenediamino)tin(IV) bis(triflate) (6b)
(N,N'-bis(3,5-tert-butylsalicylidene)-1,2-benzenediamino)tin(IV) bis-(triflate) (6c)
(N,N'-bis(3,5-di-tert-butylsalicylidene)-(R,R)-(−)-1,2-cyclohexanediamino)tin(IV) bis(triflate) (6d)
(N,N'-bis(3,5-di-tert-butylsalicylidene)-(S,S)-(+)-1,2-cyclohexanediamino)tin(IV) bis(triflate) (6e)
(N,N'-bis(3,5-di-tert-butylsalicylidene)-1,2-ethanediamino)tin(IV) bromide triflate (7a)
(N,N'-bis(3-methyl-5-tert-butylsalicylidene)-1,2-ethanediamino)tin(II) (2f)
(N,N'-bis(salicylidene)-1,2-ethanediamino)tin(II) (2g)
(N,N'-bis(3,5-dibromosalicylidene)-1,2-ethanediamino)tin(II) (2h)
(N,N'-bis(3-methoxysalicylidene)-1,2-ethanediamino)tin(II) (2i)
(N,N'-bis(3,5-dibromosalicylidene)-(S,S)-(+)-1,2-cyclohexanediamino)tin(II) (2j)
(N,N'-bis(5-nitrosalicylidene)-1,2-ethanediamino)tin(II) (2k)
(N,N'-bis(3,5-dinitrosalicylidene)-1,2-ethanediamino)tin(II) (2l)
(N,N'-bis(5-bromosalicylidene)-1,2-ethanediamino)tin(II) (2m)
(N,N'-bis(3-methyl-5-tert-butylsalicylidene)-1,2-ethanediamino)tin(IV) dibromide (4f)
(N,N'-bis(salicylidene)-1,2-ethanediamino)tin(IV) dibromide (4g)
(N,N'-bis(3,5-dibromosalicylidene)-1,2-ethanediamino)tin(IV) dibromide (4h)
(N,N'-bis(3-methoxysalicylidene)-1,2-ethanediamino)tin(IV) dibromide (4i)
(N,N'-bis(3,5-dibromosalicylidene)-(S,S)-(+)-1,2-cyclohexanediamino)tin(IV) dibromide (4j)
(N,N'-bis(5-nitrosalicylidene)-1,2-ethanediamino)tin(IV) dibromide (4k)
(N,N'-bis(3,5-dinitrosalicylidene)-1,2-ethanediamino)tin(IV) dibromide (4l)
(N,N'-bis(5-bromosalicylidene)-1,2-ethanediamino)tin(IV) dibromide (4m)

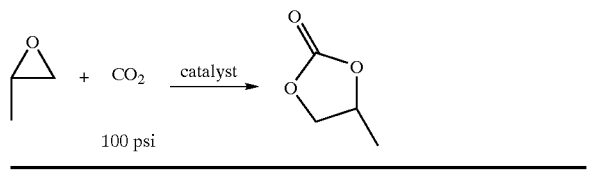

100 psi

TABLE 3c

Reaction with $CO_2$/Propylene Oxide.

| Catalyst | Temperature | Time (h) | Yield (%) | TOF* |
|---|---|---|---|---|
| 2a | 120 | 4 | 40 | 52 |
| 2b | 120 | 4 |  | NO |
| 2c | 120 | 4 |  | NO |
| 2d | 120 | 4 | 15 | 75 |
| 2e | 120 | 4 |  | NO |
| 3a | 120 | 4 |  | 159 |
| 3e | 120 | 4 |  | 233 |
| 4a | 120 | 4 | 20 | 125 |
| 4b | 120 | 4 |  | NO |
| 4c | 120 | 4 | 18 | 97 |
| 4d | 120 | 4 | 20 | 76 |
| 4e | 120 | 4 |  |  |
| 5a | 120 | 6 | 19 | 66 |
| 5b | 120 | 4 |  | NO |
| 5c | 120 | 4 |  | NO |
| 5d | 120 | 4 |  | NO |
| 5e | 120 | 5 | 17 | 79 |
| 6a | 120 | 4 | 7 | 31 |
| 6b | 120 | 4 |  | NO |
| 6c | 120 | 4 |  | NO |
| 6d | 120 | 4 |  | NO |
| 6e | 120 | 5 | 8 | 57 |
| 7a | 120 | 4 | 23 | 185 |

*5Eq DMAP ~0.05% Catalyst

TABLE 3d

Cyclic Carbonate and Reaction Parameters.

| CATALYST | DMAP | TIME | Temperature | Yield (%) | TOF** |
|---|---|---|---|---|---|
| 2e | 5eq | 14 h | 100 | 7 | 36 |
| 2e | 2eq | 9 h | 120 | 6 | 14 |
| 2e | 5eq | 12 h | 120 | 38 | 158 |
| 2e | 2eq | 9 h | 130 | 30 | 94 |
| 2e | 2eq | 8 h | 140 | 43 | 149 |
| 2e | 2eq | 2 h | 140 | 7 | 39 |
| 2e | 4eq | 2 h | 140 | 27 | 250 |
| 2e | 5eq | 5 h | 140 | 58 | 361 |
| 2e | 2eq | 8 h | 150 | 56 | 240 |
| 2e | 6eq | 3 h | 150 | 54 | 768 |
| NO | 1% | 15 h | 150 |  | 25 |
| NO | 1% | 11 h | 140 |  | 19 |
| NO | 1% | 16 h | 120 |  | 14 |
| NO | 1% | 15 h | 100 |  | 8 |
| 2a | 5eq | 2 h | 140 | 27 | 289 |
| 2a | 8eq | 4 h | 100 |  | NO |
| 3a* | 5eq | 36 h | 100 | 15 | 49 |
| 2b | 5eq | 4 h | 120 |  | NO |
| 2b | 5eq | 2 h | 140 | 32 | 348 |
| 2d | 9eq | 5 h | 120 |  | NO |
| 4a | 5eq | 2 h | 150 | 8 | 813 |
| 4j* | 5eq | 36 h | 75 | 15 | 27 |
| 5e | 9eq | 2 h | 140 | 38 | 277 |
| 6a | 8eq | 2 h | 140 | 20 | 274 |
| 6a* | 5eq | 5 h | 120 | 26 | 167 |
| 6b | 10eq | 3 h | 140 | 26 | 229 |
| 6e | 7eq | 5 h | 140 | 32 | 374 |

*catalyst was aged for 1 h at 140° C.
**~0.05 mol % catalyst. Turnover frequency is calculated as per mole catalyst per hour TABLE 3e

| Catalyst | Temperature | Time (h) | Yield (%) | TOF** |
|---|---|---|---|---|
| 2f* | 100 | 6 | 31 | 109 |
| 2g | 120 | 5 | 38 | 171 |
| 2g* | 120 | 4 | 30 | 327 |
| 2h | 120 | 2 | 37 | 157 |
| 2i | 120 | 3 | 46 | 163 |
| 2j | 120 | 3 | 36 | 202 |
| 2k | 120 | 3 | 31 | 151 |
| 2l | 120 | 4 | 22 | 162 |
| 2m | 120 | 4 | 35 | 197 |
| 4g* | 100 | 8 | 27 | 115 |
| 4g* | 120 | 3 | 40 | 290 |
| 4h* | 100 | 8 | 21 | 112 |
| 4h | 120 | 5 | 53 | 509 |
| 4i* | 120 | 7 | 45 | 320 |
| 4j* | 100 | 12 | 43 | 185 |
| 4j* | 75 | 36 | 15 | 27 |
| 4l | 120 | 3 | 26 | 142 |
| 4m | 120 | 2 | 53 | 248 |

*catalyst was aged for 1 h at 140° C.
**5equiv DMAP. ~0.05 mol % Catalyst. Turnover number frequency is calculated as per mole catalyst per hour

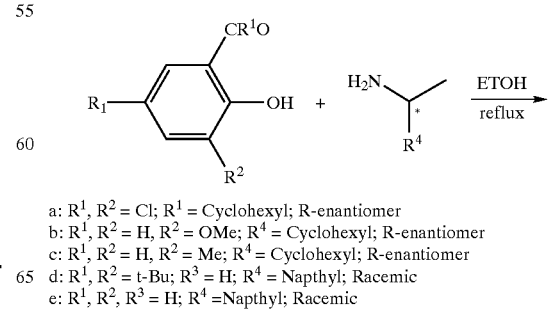

a: $R^1, R^2 = Cl$; $R^1 = $ Cyclohexyl; R-enantiomer
b: $R^1, R^2 = H$, $R^2 = $ OMe; $R^4 = $ Cyclohexyl; R-enantiomer
c: $R^1, R^2 = H$, $R^2 = $ Me; $R^4 = $ Cyclohexyl; R-enantiomer
d: $R^1, R^2 = $ t-Bu; $R^3 = H$; $R^4 = $ Napthyl; Racemic
e: $R^1, R^2, R^3 = H$; $R^4 = $ Napthyl; Racemic

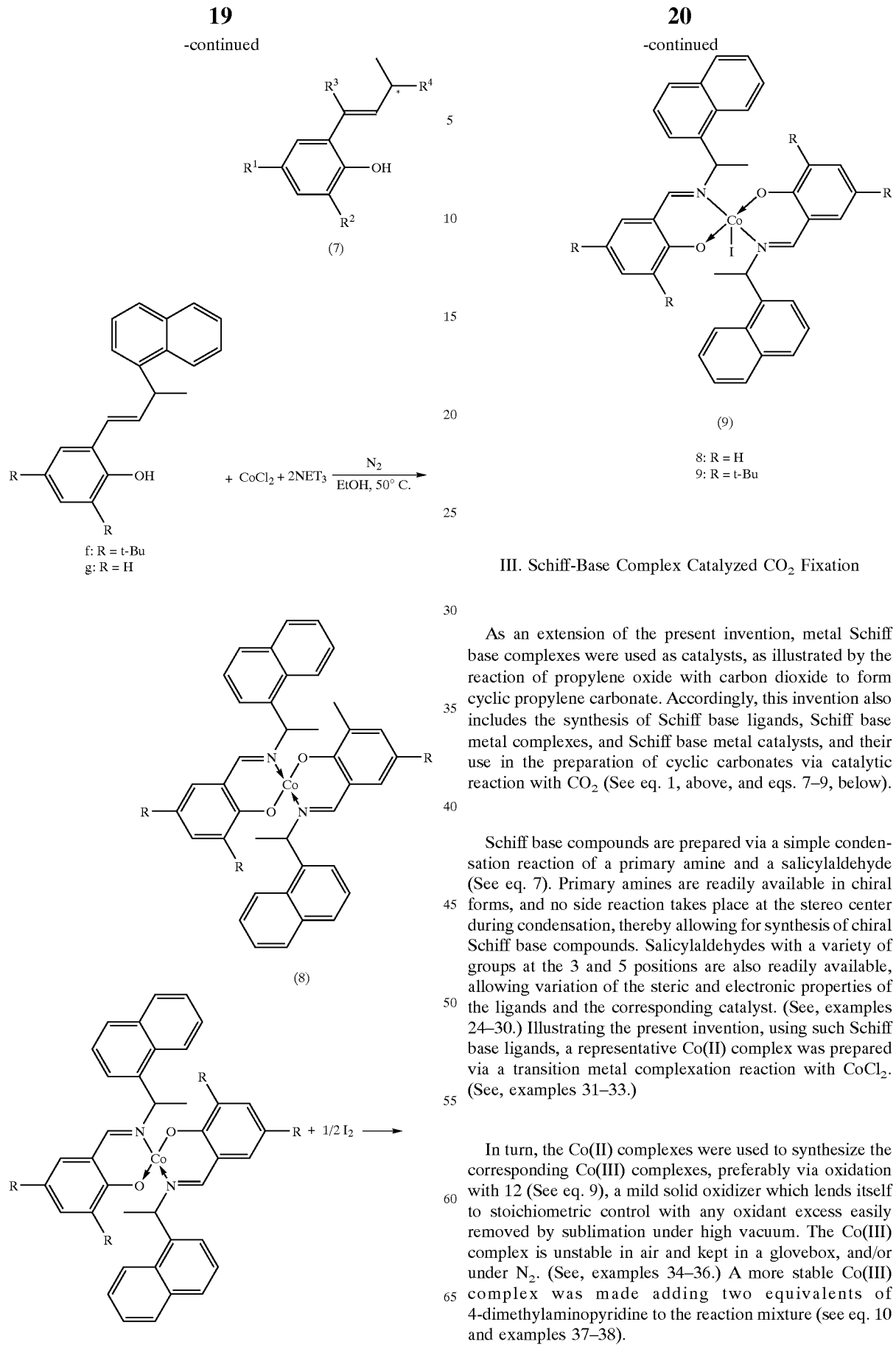

III. Schiff-Base Complex Catalyzed $CO_2$ Fixation

As an extension of the present invention, metal Schiff base complexes were used as catalysts, as illustrated by the reaction of propylene oxide with carbon dioxide to form cyclic propylene carbonate. Accordingly, this invention also includes the synthesis of Schiff base ligands, Schiff base metal complexes, and Schiff base metal catalysts, and their use in the preparation of cyclic carbonates via catalytic reaction with $CO_2$ (See eq. 1, above, and eqs. 7–9, below).

Schiff base compounds are prepared via a simple condensation reaction of a primary amine and a salicylaldehyde (See eq. 7). Primary amines are readily available in chiral forms, and no side reaction takes place at the stereo center during condensation, thereby allowing for synthesis of chiral Schiff base compounds. Salicylaldehydes with a variety of groups at the 3 and 5 positions are also readily available, allowing variation of the steric and electronic properties of the ligands and the corresponding catalyst. (See, examples 24–30.) Illustrating the present invention, using such Schiff base ligands, a representative Co(II) complex was prepared via a transition metal complexation reaction with $CoCl_2$. (See, examples 31–33.)

In turn, the Co(II) complexes were used to synthesize the corresponding Co(III) complexes, preferably via oxidation with I2 (See eq. 9), a mild solid oxidizer which lends itself to stoichiometric control with any oxidant excess easily removed by sublimation under high vacuum. The Co(III) complex is unstable in air and kept in a glovebox, and/or under $N_2$. (See, examples 34–36.) A more stable Co(III) complex was made adding two equivalents of 4-dimethylaminopyridine to the reaction mixture (see eq. 10 and examples 37–38).

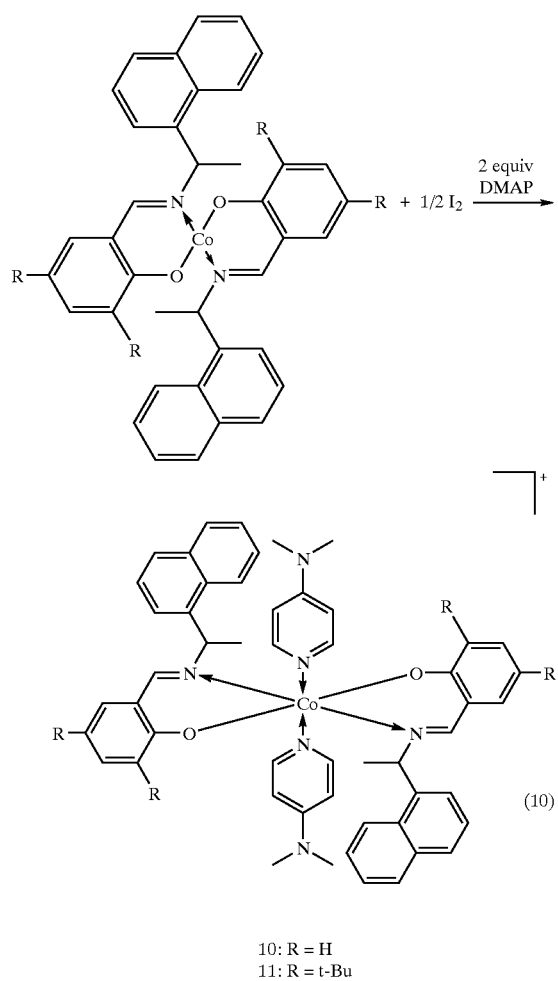

10: R = H
11: R = t-Bu

Demonstrating viability of the catalyst, a representative cyclic carbonate was synthesized via the coupling reaction of $CO_2$ and propylene oxide. This reaction (see, example 39 and Tables 4–6, below) was carried out under a variety of conditions to optimize conditions, and determine the dependence of catalyst activity on temperature, pressure, and steric hindrance. Various other complex/substrate combinations, consistent with and/or equivalent to this invention, can be employed with comparable effect.

Figure 3:
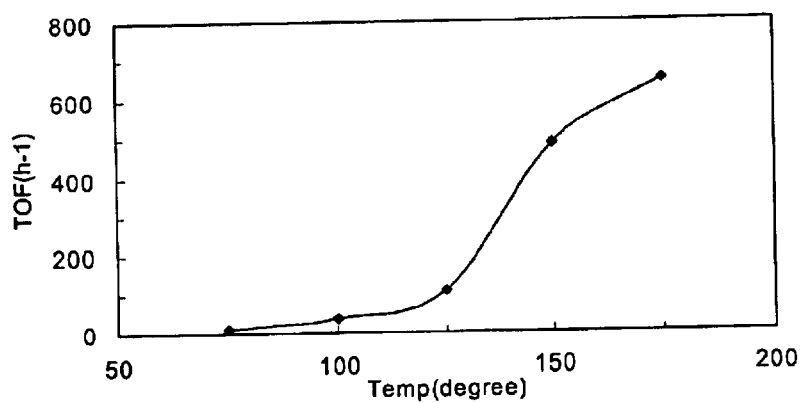
FIG. 3. Effect of temperature on catalytic activity, using for example Cpd 9 and a DMAP cocatalyst.

Compound 9 as catalyst and DMAP as cocatalyst were used to catalyze the reaction of $CO_2$ and propylene oxide, over a range of temperatures from 75° C.–175° C. The results were summarized in Table 4, and FIG. 3. From these data it is clear that activity increases with temperature.

TABLE 4

The Effect of Temperature on Catalytic Activity

| Temp (° C.) | CPC (g) | TON | TOF (h$^{-1}$) | Activity (g/g cat.) | PO conversion (%) |
|---|---|---|---|---|---|
| 75 | 0.0407 | 19.9 | 10.0 | 2.12 | 0.57 |
| 100 | 0.1586 | 77.7 | 38.8 | 8.26 | 2.22 |
| 125 | 0.4302 | 210.7 | 105.3 | 22.41 | 6.02 |
| 150 | 1.9873 | 973.3 | 486.7 | 103.51 | 27.80 |
| 175 | 2.6472 | 1296.5 | 648.3 | 137.88 | 37.03 |

Conditions: cat.(0.02 mmol); DMAP(2 equiv); $CO_2$ pressure(100 psi); propylene oxide(5 mL); $CH_2Cl_2$(0.5 mL); time(2 hours).

Figure 4:
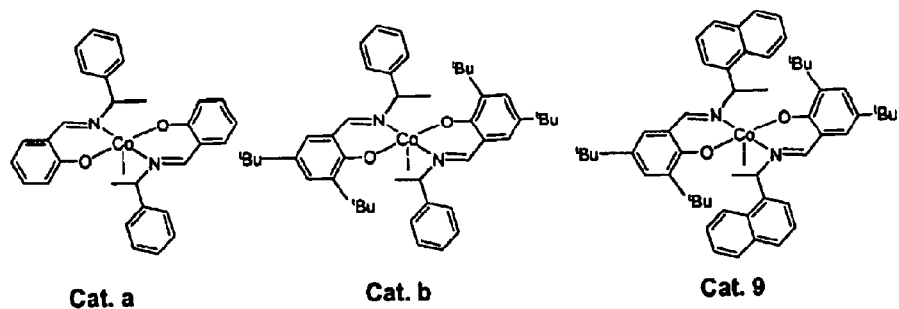
FIG. 4. A temperature study of Cpd 9, as compared to related catalyst structures to show relationship between steric factors and catalytic activity.
Figure 4:
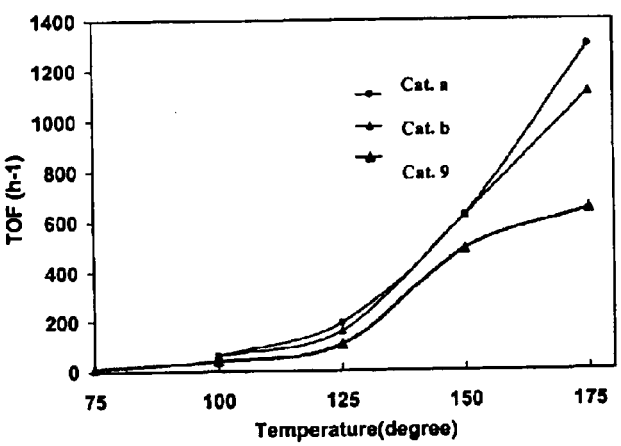

The temperature study data of compound 9 was compared with temperature study data from two related catalysts to access the relationship between steric crowding and catalytic activity. The results are summarized in FIG. 4. From these data, as steric crowding increases, activity decreases.

Figure 5:
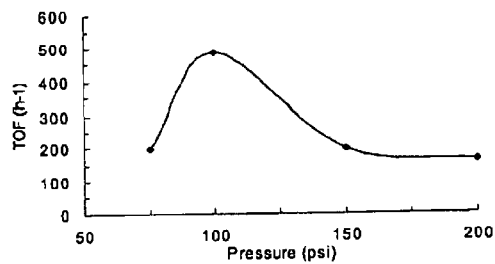
FIG. 5. The effect of pressure on catalytic activity, as demonstrated using Cpd 9.

The $CO_2$/propylene reaction illustrated was also carried out using compound 9 under various pressures, the results were summarized in Table 5 and FIG. 5.

TABLE 5

The Effect of Pressure on Catalytic Activity

| Pressure (psi) | CPC (g) | TON | TOF (h$^{-1}$) | Activity (g/g cat) | PO conversion % |
|---|---|---|---|---|---|
| 75 | 0.8019 | 392.74 | 196.37 | 41.77 | 11.22 |
| 100 | 1.987 | 973.31 | 486.65 | 103.51 | 27.80 |
| 125 | 1.111 | 544.08 | 272.04 | 57.86 | 15.54 |
| 150 | 0.801 | 392.11 | 196.05 | 41.70 | 11.20 |
| 200 | 0.663 | 324.47 | 162.23 | 34.51 | 9.27 | combinations: cat.(0.02 mmol); DMAP(2 equiv); propylene oxide(5.0 mL); $CH_2Cl_2$(0.5 mL); temp (150° C.); time(2 hours).

These data show that 100 psi $CO_2$ pressure is an optimal pressure for catalyst activity, and that under both lower pressure and higher pressures, the catalyst activity is lower than this optimum. From this it appears $CO_2$ coordination to the metal center is pressure dependent.

Compound 10 was also used to catalyze the same fixation reaction. The results of these reactions are summarized in Table 6.

TABLE 6

| Run | Cat (mg) | DMAP (mg) | CPC (g) | TON | TOF (h-1) |
|---|---|---|---|---|---|
| A | 1 | 0 | 0.962 | 9313 | 4657 |
| B | 1 | 1 | 0.984 | 9639 | 4819 |

Conditions: cat.($1.153 \times 10^{-3}$ mmol); PO(5.0 mL); $CH_2Cl_2$ (0.5 mL); temp.(150° C.); time(2 hours)

These data show that compound 10, which already has the Lewis-basic DMAP coordinateed to its metal center, catalyzes the reaction of $CO_2$ and propylene oxide effectively without the addition of the 4-dimethylaminopyridine cocatalyst.

IV. Polycarbonates via $CO_2$, Fixation

As mentioned above, various aspects of this invention can be directed to the preparation of polycarbonate compositions. Polycarbonates have found various uses as engineering polymers. Poly(bisphenol A)carbonate, for instance, is a clear, lightweight, and durable polymer that is used in automobile windshields, compact discs, digital video discs, and safety glasses. Poly(diallylethyl)dicarbonate has found widespread use in making lightweight optical glass lenses. By using certain functional groups, and controlling the molecular weight of polycarbonates, degradable polymers may be obtained. The biocompatiblility of the cyclic carbonate monomers resulting from these degradable polycarbonates portends use in time release drug capsules, bone fixation plates and screws, ligature clamps, resorbable prostheses, and suture filaments. The versatility of such polycarbonate systems requires a pathway for more efficient and cost effective production.

The prior art includes several efforts towards polycarabonate production, of which U.S. Pat. No. 6,262,278 is typical. Therein is disclosed an uncharacterized, unisolated polycarbonate intermediate en route to a cyclic carbonate product. A metal-salen complex was used only in such a way to resolve a racemic mixture of epoxide starting material. (See Example 13 of the '278 patent.)

As part of the present investigation supporting this invention, it was observed that under conditions of the sort described herein, various epoxide substrates could be used monomerically, with carbon dioxide fixation, in the production of the corresponding polycarbonate composition. Preparatory techniques and procedures are analogous to those employed elsewhere herein, modified as shown, for example, in conjunction with several figures and examples. For purposes of illustration, such preparation is discussed using a representative complex of this invention, 1a, above. Reference is made to examples 40–48, below for further discussion regarding temperature, pressure and related reaction parameters. The utility of this approach is demonstrated using cyclohexene oxide and the aforementioned complex, but those individuals skilled in the art made aware of this invention would understand that this synthetic methodology can be extended to various other substrates and metal-complex combinations, consistent with the broader aspects of this invention. Such extensions can be achieved using the procedures and techniques described herein or through straight-forward modifications thereof, such modifications as would also be known or readily available to such individuals without undue experimentation.

Generally, as shown in the data of several examples, ligand structure can be used to affect and/or enhance catalytic activity. Choice of counter anion can have a pronounced effect on both rate and production, although at least in part some such observations may be a function of the presence and/or identity of a particular cocatalyst component. Likewise, the ligand structure can be used beneficially. For example, a stereochemical configuration preferred for cyclic carbonate production (cis complex 1d, above) was found less than optimal for this purpose. Polycarbonate production is preferably accomplished using various trans ligand configurations. Again, reference is made to examples 40–48, below.

EXAMPLES OF THE INVENTION

The following non-limiting examples and data illustrate various aspects and features relating to the catalytic complexes, systems and/or methods of the present invention, including the use of salen complexes to effect various synthetic transformations and provide poly- or cyclic carbonate compositions, such as are available through the synthetic methodologies described herein. In comparison with the prior art, the present methods and related catalytic components provide results and data which are surprising, unexpected and contrary to the prior art. While the utility of this invention is illustrated through the use of several catalytic systems and associated complexes and metal centers which can be used therewith, it will be understood by those skilled in the art that comparable results are obtainable with various other systems and catalytic complexes, as are commensurate with the scope of this invention.

I. Examples 1–13

General Information. $^1$H and $^{13}$C NMR spectra were recorded on a Mercury 400 (400.178 MHz for $^1$H, 100 MHz for $^{13}$C) spectrometer. $^1$H NMR data are reported as follows: chemical shift (multiplicity (b=broad, s=singlet, d=doublet, t=triplet, q=quartet, and m=multiplet), and integration). $^1$H and $^{13}$C chemical shifts are reported in ppm downfield from tetramethylsilane (TMS, ε scale) with the solvent resonances as internal standards. IR data were collected on a Nicolet 5PC FT-IR spectrometer with PC-IR software. Mass spectra were obtained from the Mass Spectrometry Laboratory, University of Illinois (Urbana, Ill.). Elemental analyses were provided by Atlantic Microlab, Inc. (Norcross, Ga.).

Materials. Dichloromethane was distilled over calcium hydride. Tetrahydrofuran (THF) was distilled over sodium/benzophenone. All solvents were distilled under nitrogen and saturated with nitrogen prior to use. $CrCl_2$ (anhydrous, 99.99%) and all other reagents were purchased from the Aldrich Chemical Company or TCI America and used without further purification, unless otherwise noted.

Example 1

Synthesis of NN'-Bis(3,5-di-tert-butylsalicylidene)-1,2-meso-diphenyl-1,2-diaminoethane. meso-1,2 Diphenylethylenediamine (0.4530 g, $2.13\times10^{-3}$ mol) was added to a solution of 3,5-di-tert-butyl-2-hydroxybenzaldehyde (1.030 g, $4.40\times10^{-3}$ mol) in anhydrous ethanol (30 mL) in a round-bottom flask equipped with a magnetic stir bar and a West condenser. The resulting yellow solution was set to reflux for 3 h, during which time copious amounts of precipitate formed. The reaction mixture was allowed to cool to room temperature, water (5 mL) was added and the reaction was allowed to sit overnight at ambient temperature. The mixture was then filtered over a Buchner funnel to yield clean N,N'-Bis(3,5-di-tert-butylsalicylidene)-1,2-meso-diphenyl-1,2-diaminoethane (a yellow solid, 1.296 g, 94% yield). $^1$H NMR ($CD_2Cl_2$): δ 1.28 (s, 9H, -t-butyl), 1.46 (s, 9H, -t-butyl), 4.83 (s, 2H, N—CH), 7.02 (d, 2H, aromatic-H), 7.28 (m, 2H, aromatic-H), 7.32 (d, 8H, aromatic-H), 7.40(d, 2H, aromatic-H), 8.28 (s, 2H, N=CH), 13.56 (s, 2H, OH). $^{13}$C NMR ($CD_2Cl_2$): δ 29.77, 31.79, 34.61, 35.55, 80.20, 118.24, 126.75, 127.71, 127.98, 128.57, 128.65, 136.74, 140.01, 140.61, 158.17, 167.15. HRFABMS: m/z calcd for $C_{44}H_{57}N_2O_2([MH]^+)$: 645.4420. Found: 645.4421.

Example 2

Synthesis of 1,2-meso-diphenyl-1,2-ethylenediamino-N,N'-Bis(3,5-di-tert-butylsalicylidene) chromium(III) chloride (1d). Complex 1d was synthesized according to a modified literature procedure.[Martinez, 1995 #29] Under an inert atmosphere of dry nitrogen, $CrCl_2$ (0.275 g, $2.24\times10^{-3}$ mol) was added to a THF (40 mL) solution of N,N'-Bis(3,5-di-tert-butylsalicylidene)-1,2-meso-diphenyl-1,2-diaminoethane (1.164 g, $1.8\times10^{-3}$ mol). The reaction was stirred for 3 h under $N_2$, then opened to the air and stirred for an additional 3 h. The reaction was then poured into tert-butyl methyl ether (200 mL) and washed with a saturated solution of $NH_4Cl$ (3×150 mL) and brine (3×150 mL), dried (over $Na_2SO_4$), and filtered. The solvent was removed from the filtrate under vacuum to yield 1d (1.25 g, 95% yield) as a reddish brown powder. IR (KBr, cm$^{-1}$): 3420, 2952, 2900, 2864, 2360, 2337, 1771, 1733, 1716, 1699, 1683, 1652, 1645, 1634, 1616, 1558, 1539, 1521, 1506, 1472, 1456, 1436, 1418, 668. HRFABMS: m/z calcd for $[C_{44}H_{54}N_2O_2Cr]^+([1d—Cl]^+)$: 694.359039. Found: 694.358900. EA: calcd for $C_{44}H_{54}ClCrN_2O_2 \cdot 1/2H_2O \cdot 1THF$: C, 71.05; H, 7.83; N, 3.45; Cl, 4.37. Found: C, 70.99; H, 7.73; N, 3.54; Cl, 4.16.

Example 3

Representative Procedure for the Coupling Reaction of Epoxides and $CO_2$

With reference to the data of FIG. 1, on the bench top, a 125-mL stainless steel Parr high pressure reactor was charged with complex 1d (27.8 mg, $3.81 \times 10^{-5}$ mol), propylene oxide (4 mL, 3.32 g, $5.72 \times 10^{-2}$ mol), DMAP (4.6 mg, $3.81 \times 10^{-5}$ mol), and $CH_2Cl_2$ (0.5 mL). The reaction vessel was placed under a constant pressure of $CO_2$ for 5 min to allow the system to equilibrate and then heated to 75° C. for 2 h. The vessel was then cooled to ambient temperature by placement in a dry ice/water bath, the pressure released, and the contents transferred to a 50-mL round-bottom flask. Unreacted substrate and solvent were removed in vacuo and the product was then isolated via Kugelrohr distillation (65° C./0.2 mm). Note: For $CO_2$ pressures below 6.7 atm the reaction vessel was connected to a $CO_2$ source throughout the reaction via a one-way check valve to maintain the pressure at the desired level. Otherwise dramatic drops in pressure arising from $CO_2$ consumption would result.

Example 4

Figure 6:
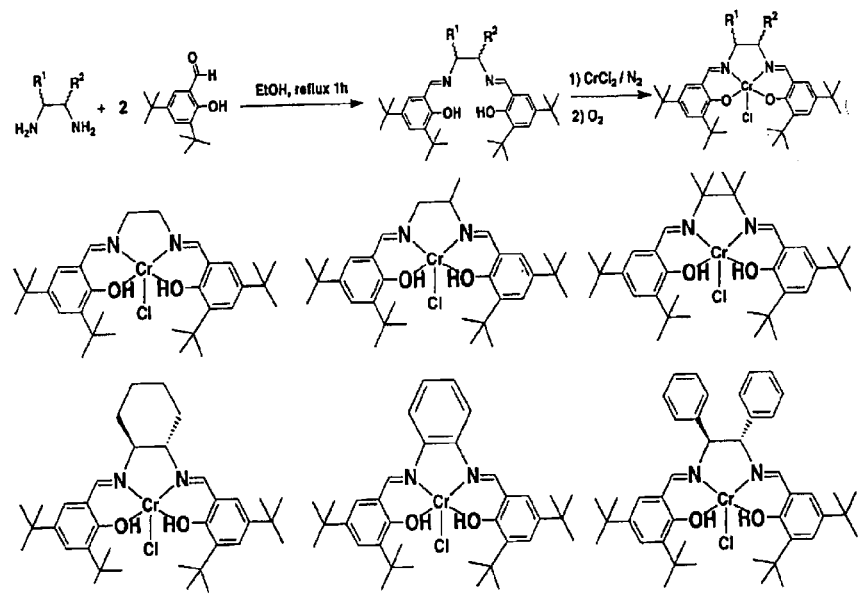
FIG. 6. Representative ligand structures, as available through choice of diamine reagent.

With reference to FIG. 6, this example illustrates the variation of a salen ligand structure through choice and variation of diamine reagent. For purposes of illustration, only one of various other metal materials are shown as complexed with the resulting ligand structure.

Example 5

Figure 7:
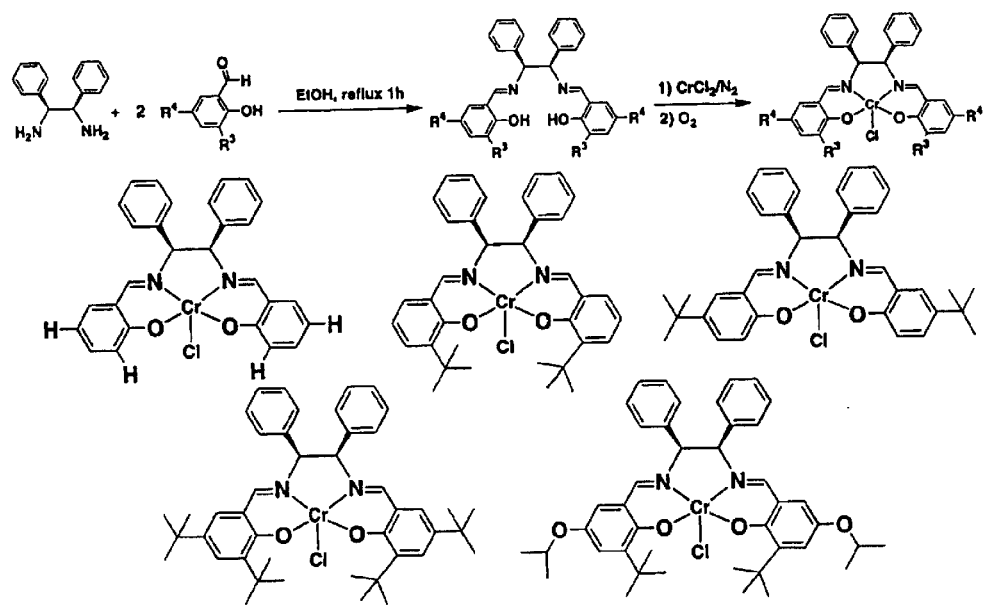
FIG. 7. Additional, alternate ligand structures, as can be varied by choice of aldehyde reagent.

With reference to FIG. 7, alternatively, a salen ligand structure can vary with choice of aldehyde starting material. Again, for purposes of illustration, one representative metal is shown complexed with the resulting ligand structure. With reference to the preceding example, the range of salen ligands and corresponding metal complexes are limited only by the commercial or synthetic availability of starting material reagents and complexation of the resulting ligand with a particular metal center.

Example 6

Figure 8:
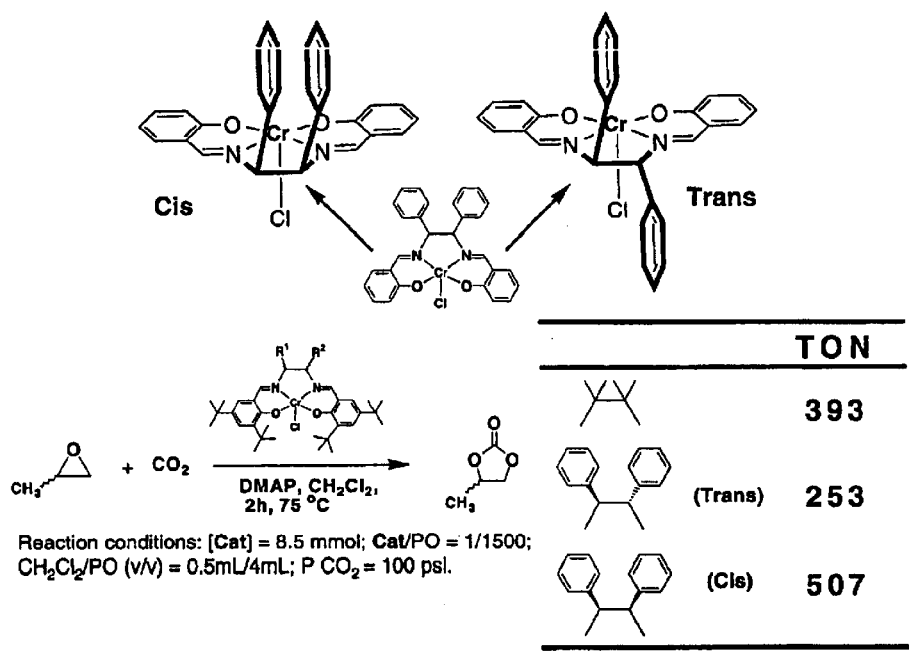
FIG. 8. Effect of ligand stereochemistry on catalytic activity.

With reference to FIG. 8 and the stereochemical relationship shown, choice of metal-ligand complex can affect catalytic activity. Comparable results can be obtained through various other embodiments of this invention.

Example 7

Figure 9:
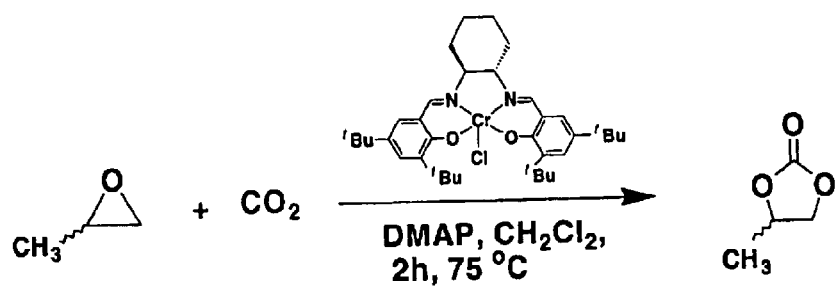
FIG. 9. Effect of solvent on cyclic carbonate synthesis, as illustrated through use of one representative metal-ligand complex of this invention.

The data of FIG. 9 as incorporated into this example shows, in stark contrast to the prior art, little or no solvent is required to effect the desired synthetic transformation. In preferred embodiments of this invention, solvent may be used only as needed to solubilize a given metal-ligand complex, the benefits of which are both economic and environmental.

Example 8

Figure 10:
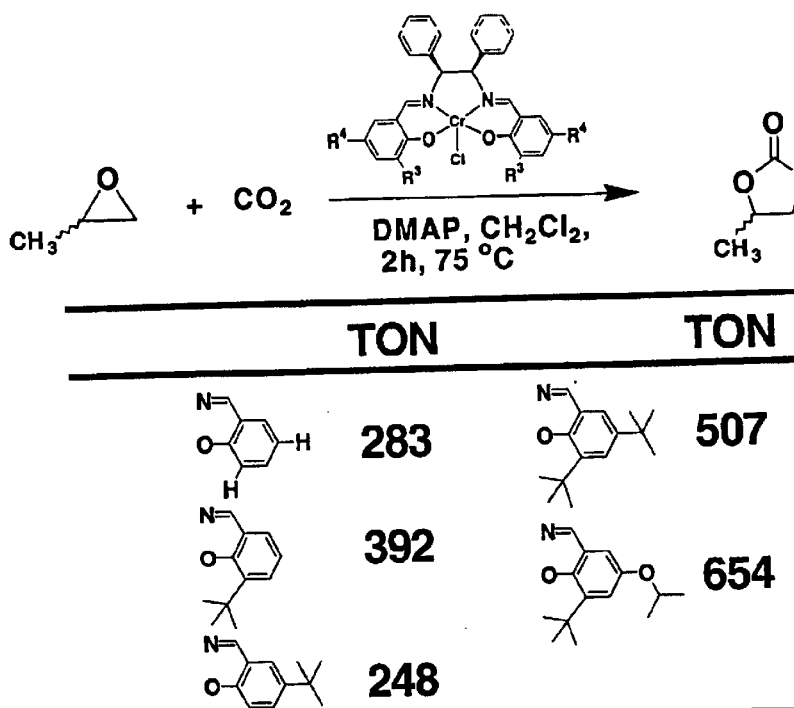
FIG. 10. Variation of ligand substituents on catalytic activity. Similar effects are available through use of other catalytic complexes and/or systems of this invention.

With reference to FIG. 10, variation of ligand substituent, as available through choice of aldehyde starting materials, can be used beneficially to affect catalytic activity.

Example 9

Figure 11:
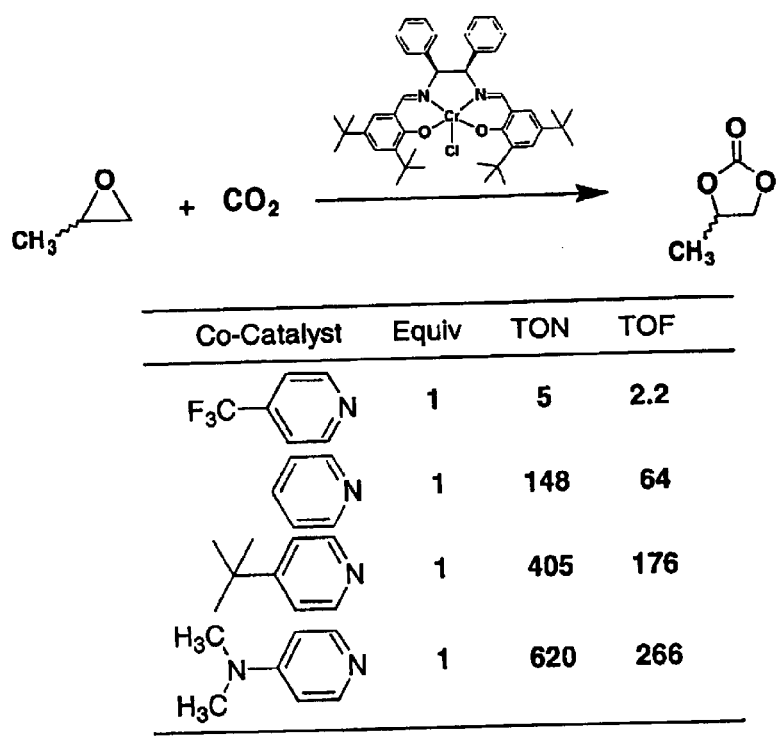
FIG. 11. Comparative catalytic activities among various pyridinyl cocatalytic components of this invention.

While DMAP is a preferred cocatalytic component, other Lewis bases can be employed to effect cyclic carbonation. Comparative results (TONs and TOFS) are shown in FIG. 11.

Example 10

Figure 12:
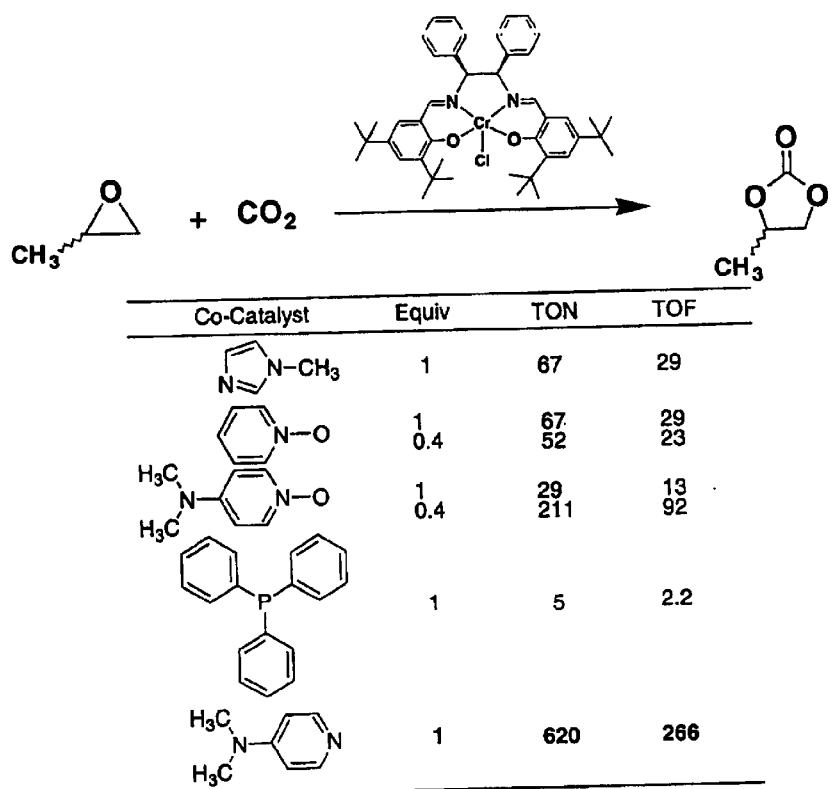
FIG. 12. Activities of other cocatalytic components, as compared to DMAP, in the preparation of a cyclic carbonate product.

Referring to FIG. 12, various other cocatalytic components can be used, in accordance with this invention. The data of this example shows such activities, as compared to a preferred DMAP component, and as varied in component concentration.

Example 11

Figure 13:
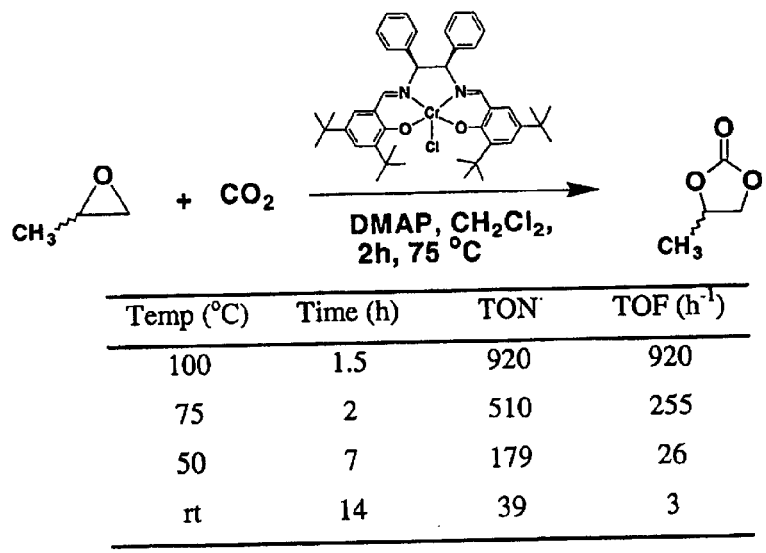
FIG. 13. Effect of reaction temperature in the enhancement of catalytic activity, in the context of cyclic carbonate production.

Referring to FIG. 13 and as discussed more fully above, an increase in reaction temperature can enhance catalytic activity. As shown by the data of this example, good activities are available at temperatures considerably less than those utilized in prior art procedures.

Example 12

Figure 14:
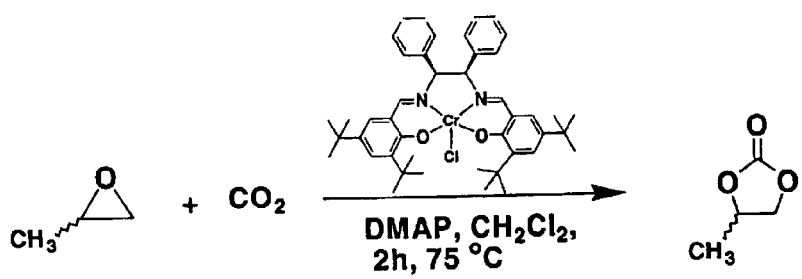
FIG. 14. Effect of DMAP concentration on catalytic activity and cyclic carbonate production.

With reference to FIG. 14 and as discussed more fully above, the present invention is directed, in part, to use of a cocatalyst material to enhance catalytic activity, in terms of either TON or TOF. The data of this example shows, with one of various available metal-ligand complexes, the use of a preferred cocatalyst (DMAP). Increasing concentration, relative to a particular complex, can be used to increase activity and resulting production.

Example 13

Figure 15:
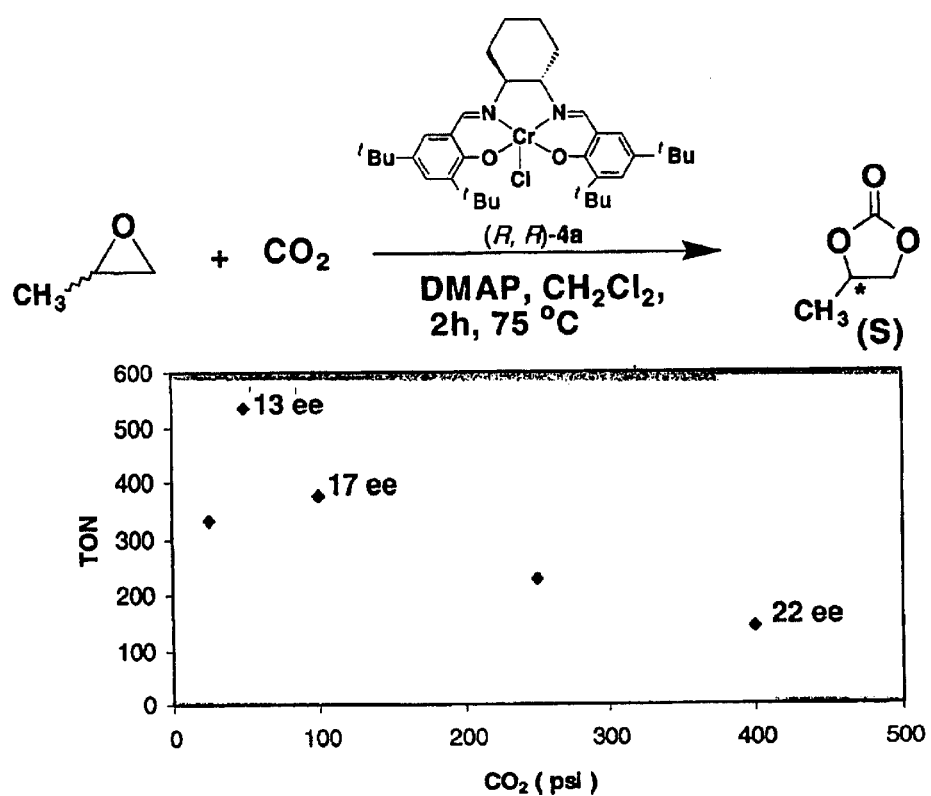
FIG. 15. Graphic representation showing entaniomeric enrichment of racemic substrates.

Reactant $CO_2$ pressures can also be used to enhance or enrich entaniomeric effect. Comparable results are obtainable through use of various other racemic substrates and various other metal-ligand complexes of this invention. Reference is made to FIG. 15.

II. Examples 14–23

General $^1H$ and $^{13}C$ NMR spectra were recorded on either a Varian Inova 500 (499.773 MHz for $^1H$ and 125.669 MHz for $^{13}C$) or Mercury 400 (400.178 MHz for $^1H$ and 100.576 MHz for $^{13}C$) spectrometer. $^{19}F$ NMR and $^{119}Sn$ NMR spectra were recorded on a Varian Inova 400 (149.141 MHz for $^{119}Sn$, 376.503 MHz for $^{19}F$) spectrometer. $^1H$ NMR data are reported as follows: chemical shift (multiplicity (s=singlet, d=doublet, t=triplet, q=quartet, and m=multiplet), and integration). $^1H$ and $^{13}C$ chemical shifts are reported in ppm downfield from tetramethylsilane (TMS, scale) with the solvent resonances as internal standards. $^{119}Sn$ chemical shifts are reported in ppm from external tetramethyltin standard. $^{19}F$ chemical shifts are reported in ppm from external $CFCl_3$ standard. Mass spectra were obtained from the Mass Spectrometry Laboratory, University of Illinois (Urbana, Ill.). Elemental analyses were provided by Atlantic Microlab, Inc. (Norcross, Ga.). All reactions were carried out under a dry nitrogen atmosphere either in an inert-atmosphere glove box or by using standard Schlenk techniques unless otherwise noted. Flash column chromatography was carried out with 230–400 mesh silica gel, purchased from Merck.

Materials

Schiff base ligands L=a (1,2-ethanediamino-N,N'-bis(3,5-di-tert-butylsalicylidene)), b (1-methyl-1,2-ethylenediamino-N,N'-bis(3,5-di-tert-butylsalicylidene)), c (1,2-benzenediamino-N,N'-bis(3,5-di-tert-butylsalicylidene)), and d ((R,R)-(−)-1,2-cyclohexanediamino-N,N'-bis(3,5-di-tert-butylsalicylidene)), were synthesized from 3,5-di-tert-butylsalicylaldehyde and the corresponding diamine following literature procedures. Ligand e ((S,S)-(+)-1,2-cyclohexanediamino-N,N'-bis(3,5-di-tert-butylsalicylidene)) was obtained from Aldrich (at >98% ee). Dichloromethane was distilled over calcium hydride. Tetrahydrofuran (THF), and hexanes were distilled over sodium/benzophenone. Ethanol was distilled over Mg(OEt)$_2$. All solvents was distilled under nitrogen, stored in Strauss flasks, and saturated with nitrogen prior to use. Deuterated dichloromethane was purchased from Cambridge Isotope Laboratories and distilled over calicium hydride. Silica gel (Merck) was activated at 600° C. for 6 h to remove surface hydroxyl groups before being used in the chromatography of (salen)Sn$^{IV}$Cl$_2$ complexes.

Example 14
General Procedure for the Synthesis of 2a–e

A mixture of the salenH$_2$ ligand a–e (1 equiv), SnCl$_2$ (190 mg, 1 mmol), Et$_3$N (0.28 cm$^3$, 2 mmol) and EtOH (5–10 cm$^3$) was heated at 85 C for 10–24 h in a closed round-bottom Schlenk tube equipped with a Kontes 8-mm PTFE valve. After cooling, the reaction mixture was transferred to a Schlenk flask in the glove box, filtered via a cannula, washed with ethanol (2×5 cm$^3$) and hexanes (2×5 cm$^3$), and dried in vacuo.

Example 15
(N,N'-bis(3,di-tert-butylsalicylidene)-1,2-ethanediamino)tin (II) (2a)

Orange solid, yield=514 mg (84%). $^1$H NMR (CD$_2$Cl$_2$): δ 8.67 (s, 2H), 7.44 (d, 2H, J=2.4 Hz), 6.97 (d, 2H, J=2.4 Hz), 3.92 (m, 2H), 3.72 (m, 2H), 1.47 (s, 18H), 1.30 (s, 18H). $^{13}$C NMR (CD$_2$Cl$_2$): δ 167.8 (CH=N), 163.5, 142.2, 137.6, 129.8, 128.1, 120.1, 56.1, 35.9, 34.4, 31.9 (CMe$_3$), 30.2 (CMe$_3$). $^{119}$Sn NMR(CD$_2$Cl$_2$): δ 516.7. EIMS: m/z 610.3 (M+, 0.5), 595.2 (0.3), 492.4 (100), 259.2 (46), 231.2 (44). HREIMS: calcd. for [SnC$_{32}$H$_{46}$N$_2$O$_2$]$^+$: 610.2581; found: 610.2587. Anal.: calcd. for C$_{32}$H$_{46}$N$_2$O$_2$Sn: C, 63.07; H, 7.61; N, 4.60. Found: C, 62.80; H, 7.69; N, 4.70.
(N,N'-bis(3,5-di-tert-butylsalicylidene)-1-methyl-1,2-ethylenediamino)tin(II) (2b)

Orange solid, yield=491 mg (79%). $^1$H NMR (CD$_2$Cl$_2$). 8.2–8.14 (odd d, 2H, CH=N), 7.43 (q, 2H, J=2.8, 3.2 Hz), 6.98 (q, 2H, J=2.8, 2.8 Hz), 4.05–3.75 (m, 2H), 3.63 & 3.39 (2 m, 1H), 1.47 (d, 3H, J=6.0 Hz), 1.45 (s, 18H), 1.30 (s, 18H). $^{13}$C NMR (CD$_2$Cl$_2$): δ 168.9 (CH=N), 168.2 (CH=N), 166.3, 164.0, 163.8, 163.1, 142.6, 142.4, 142.3, 137.9, 137.8, 137.7, 130.0, 129.8, 129.7, 128.5, 128.3, 128.2, 120.6, 120.4, 120.1, 120.0, 62.4, 62.1, 61.9, 58.2, 35.8, 34.3, 31.7 (CMe$_3$), 30.1 (CMe$_3$), 19.4, 19.2. $^{119}$Sn NMR (CD$_2$Cl$_2$): δ –526.5. EIMS: m/z 624.3 (M$^+$, 0.6), 609.2 (0.3), 506.4 (100), 273.2 (62), 238.2 (41). HREIMS: exact mass calcd. for [SnC$_{33}$H$_{48}$N$_2$O$_2$]$^+$: 624.2738; found: 624.2746. Anal.: calcd. for C$_{33}$H$_{48}$N$_2$O$_2$Sn: C, 63.58; H, 7.76; N, 4.49. Found: C, 63.39; H, 7.91; N, 4.59.
(N,N'-bis(3,5-tert-butylsalicylidene)-1,2-benzenediamino) tin (II) (2c)

Red solid, yield=332 mg (50%). $^1$H NMR (CD$_2$Cl$_2$): δ 8.41 (s, 2H), 7.56 (m, 4H), 7.42 (m, 2H), 7.08 (d, 2H, J=2.4 Hz), 1.53 (s, 18H), 1.36 (s, 18H). $^{13}$C NMR (CD$_2$Cl$_2$): δ 164.4 (CH=N), 162.2, 142.3, 139.9, 138.2, 131.4, 129.2, 129.1, 120.3, 118.0, 35.9, 34.5, 31.7 (CMe$_3$), 30.2 (CMe$_3$). $^{119}$Sn NMR (CD$_2$Cl$_2$): δ –501.4. EIMS: m/z 658.2 (M+, 22), 643.2 (12), 540.4 (50), 446.1 (17), 323.2 (73), 119.1(100). HREIMS: exact mass calcd. for [SnC$_{36}$H$_{46}$N$_2$O$_2$]$^+$: 658.2581; found: 658.2588. Anal.: calcd. for C$_{36}$H$_{46}$N$_2$O$_2$Sn.¾C$_2$H$_5$OH: C, 65.09; H, 7.36; N, 4.05. Found: C, 64.96; H, 7.07; N, 4.24.
(N,N'-bis(3,5-di-tert-butylsalicylidene)(R,R)-(-)-1,2-cyclohexanediamino)tin(II) (1d) Orange crystalline solid. 15
(N,N'-bis(3,5-di-tert-butylsalicylidene)-(S,S)-(+)-1,2-cyclohexanediamino)tin(II) (2e)

Orange solid, yield=620 mg (93%). $^1$H NMR (CD$_2$Cl$_2$): δ 8.18 (s, 1H, JS,H=12 Hz), 8.11(s, 1H, J$_{Sn-H}$=13.6 Hz) 7.46 (d, 1H, J=2.8 Hz), 7.43 (d, 2H, J=2.4 Hz), 7.06 (d, 1H, J=2.8 Hz), 6.96 (d, 1H, J=2.4 Hz), 1.49 (s, 18H), 1.33 (s, 9H), 1.32(s, 9H). $^{13}$C NMR (CD$_2$Cl$_2$): δ 167.1 (CH=N), 163.7, 163.2, 161.5 (CH=N), 142.2, 142.0, 137.5, 137.3, 129.8, 129.3, 128.6, 128.5, 120.2, 119.8, 66.4, 64.5, 36.0, 35.8, 34.4, 31.8 (CMe$_3$), 30.7 (CMe$_3$), 30.2, 27.6, 25.3, 24.8. $^{119}$Sn NMR (CD$_2$Cl$_2$): δ –521.5. FABMS (found/calcd): m/z 664.2/664.3 (M$^+$). Anal.: calcd. for C$_{36}$H$_{52}$N$_2$O$_2$Sn: C, 65.17; H, 7.90; N, 4.22. Found: C, 65.09; H, 7.95; N, 4.25.

Example 16
Isolation of the bis ligand complex Bis(N,N'-bis(3,5-di-tert-butylsalicylidene)-1,2-ethanediamino)tin(II) (2a').

Complex 1a (200 mg) was dissolved in THF (5 cm$^3$) in a Schlenk flask equipped with a septum that has been punctured with several holes. The reaction was allowed to stir for 5 days under nitrogen over which time the color of the solution changed from orange to yellow-green and a white precipitate appeared in the reaction flask. The reaction was cannula-filtered into another Schlenk flask. The filtrate was then evaporated, dried in vacuo, and recrystallized with benzene/hexanes to yield a pale yellow-green solid (92 mg, 51%). $^1$H NMR (CD$_2$Cl$_2$): δ 13.69 (s, 1H, OH), 8.40 (s, 2H), 7.36 (d, 2H), 7.09 (d, 2H), 3.92 (s, 4H), 1.40 (s, 18H), 1.27 (s, 18H). $^{13}$C NMR (CD$_2$Cl$_2$): δ 167.9 (CH=N), 158.2, 140.5, 136.7, 127.3, 126.4, 118.21, 60.1, 35.5, 34.6, 31.8 (CMe$_3$), 29.7 (CMe$_3$). FABMS (found/calcd): m/z 1101.6/1101.6 with perfect isotopic pattern simulation for C$_{64}$H$_{93}$N$_4$O$_4$Sn.

Example 17
General Procedure for the Synthesis of 3a and 3e

To a CH$_2$Cl$_2$ solution (10 cm$^3$) of salenH$_2$ a or e (1 mmol), and Et$_3$N (0.28 cm$^3$, 2 mmol) in a 50-mL Schlenk flask equipped with a magnetic stir bar was added SnCl$_4$ (0.12 cm$^3$, 1 mmol). After stirring for 12 h under nitrogen, the reaction mixture was passed through a silica gel column under nitrogen using CH$_2$Cl$_2$ as eluent. Only the yellow fraction was collected and the solvent was removed in vacuo.
(N,N'-bis(3,5-di-tert-butylsalicylidene)-1,2-ethane diamino)tin(IV)dichloride (3a)

Pale yellow solid, yield=102 mg (15%). $^1$H NMR (CD$_2$Cl$_2$): δ 8.30 (s, 2H, J$_{Sn-H}$=43.0 Hz), 7.67 (d, 2H), 7.14 (d, 2H, J=2.4 Hz), 4.20 (s, 4H), 1.50 (s, 18H), 1.35 (s, 18H). $^{13}$C NMR (CD$_2$Cl$_2$): δ 171.2 (CH=N), 163.9, 142.8, 140.6, 132.9, 130.3, 117.4, 52.3, 35.8, 34.3, 31.5 (CMe$_3$), 29.8 (CMe$_3$). $^{119}$Sn NMR(CD$_2$Cl$_2$): δ –595.5. FABMS (found/calcd): m/z645.1/645.2(M—Cl$^+$). Anal.: calcd. for C$_{32}$H$_{46}$Cl$_2$N$_2$O$_2$Sn: C, 56.50; H, 6.82; N, 4.12. Found: C, 56.61; H, 6.85; N, 4.17.
(N,N'-bis(3,5-di-tert-butylsalicylidene)-(S,S)-(+)-1,2-cyclohexanediamino)tin (IV)dichloride (3e)

Yellow solid, yield=106 mg (20%). $^1$H NMR (CDCl$_3$): δ 8.16 (s, 2H, J$_{Sn-H}$=44.0 Hz), 7.61 (d, 2H, J=3.6 Hz), 7.06 (s, 2H, J=3.2 Hz), 4.02 (m, 2H), 2.56 (m, 2H), 2.12 (m, 2H), 1.53 (m, 4H), 1.49 (s, 18H), 1.32 (s, 18H). $^{13}$C NMR (CDCl$_3$): δ 167.9 (CH=N), 163.7, 142.7, 141.1, 132.8, 131.3, 117.9, 62.7, 54.6, 36.0, 34.6, 31.5 (CMe$_3$), 29.9 (CMe$_3$), 27.0, 24.0, $^{119}$Sn NMR (CD$_2$Cl$_2$): δ –593.9. FABMS (found/calcd): m/z 700.0/699.3 (M–Cl$^+$). Anal. calcd. for C$_{36}$H$_{52}$Cl$_2$N$_2$O$_2$Sn.½CH$_2$Cl$_2$: C, 56.43; H, 6.88; N, 3.61. Found: C, 56.43; H, 6.85; N, 3.67.

Example 18
General Procedure for the Synthesis of 4a–e

To a CH$_2$Cl$_2$ solution (10 cm$^3$) of (Salen)Sn$^{II}$ (1a–e, 0.5 mmol) in a Schlenk flask equipped with a magnetic stir bar was added Br$_2$ (0.026 cm$^3$, 0.5 mmol). After stirring for 12 h, the reaction mixture was concentrated to near dryness. Hexanes (10 cm$^3$) was then added and the resulting mixture was allowed to stir for an additional 2–4 h. The mixture was then filtered using cannula; the remaining solid product was washed with hexanes (2×10 cm$^3$) and dried under vacuum.

(N,N'-bis(3,5-di-tert-butylsalicylidene)-1,2-ethanediamino)tin (IV)dibromide (4a)

Yellow solid, yield=362 mg (94%). $^1$H NMR (CD$_2$Cl$_2$): δ 8.25 (s, 2H, J$_{Sn-H}$=39.5 Hz), 7.67 (s, 2H), 7.13 (d, 2H, J=2.4 Hz), 4.18 (s, 4H), 1.50 (s, 18H), 1.34 (s, 18H). $^{13}$C NMR (CD$_2$Cl$_2$): δ 170.9 (CH=N), 162.9, 142.4, 140.9, 132.9, 130.5, 117.2, 51.8, 35.8, 34.4, 31.3 (CMe$_3$), 29.8 (CMe$_3$). $^{119}$Sn NMR (CD$_2$Cl$_2$): δ −719.1. FABMS (found/calcd): m/z 690/689.2(M−Br$^+$). Anal. calcd. for C$_{32}$H$_{46}$Br$_2$N$_2$O$_2$Sn.CH$_2$Cl$_2$: C, 49.47; H, 5.97; N, 3.59. Found: C, 49.55; H, 5.91; N, 3.66.

(N,N'-bis(3,5-di-tert-butylsalicylidene)-1-Methyl-1,2-ethane-diamino)tin(IV)dibromide (4b)

Yellow solid, yield=352 mg (90%). $^1$H NMR (CDCl$_3$): δ 8.20 (s, 2H, J$_{Sn-H}$=40.0 Hz), 7.63 (s, 2H), 7.05 (d, 2H, J=11.5 Hz), 4.53 (m, 1H), 4.03 (m, 2H), 1.67 (d, 3H, J=6.5 Hz), 1.52 (s, 18H), 1.32 (s, 18H). $^{13}$C NMR (CDCl$_3$): δ171.4 (CH=N), 169.5, 142.9, 142.8, 141.2, 133.3, 133.1, 131.3, 130.8, 117.6, 58.0, 56.0, 36.0, 34.6, 31.5 (CMe$_3$), 30.0 (CMe$_3$), 17.3 (Me). $^{119}$Sn NMR (CD$_2$Cl$_2$): δ−714.6. APCIMS (MeCN, found/calcd): m/z 703/703.2 (M−Br$^+$). Anal.: calcd. for C$_{33}$H$_{48}$Br$_2$N$_2$O$_2$Sn.¼CH$_2$Cl$_2$: C, 49.64; H, 6.08; N, 3.48. Found: C, 49.66; H, 6.15; N. 3.55.

(N,N'-bis(3,5-tert-butylsalicylidene)-1,2-benzenediamino)tin (IV)dibromide (4c)

Orange-red solid, yield=368 mg (90%). $^1$H NMR (CD$_2$Cl$_2$): δ8.78 (s, 2H, J$_{Sn-H}$=39.2 Hz), 7.84 (q, 2H, J=3.4, 3.2 Hz), 7.76 (d, 2H, J=2.4 Hz), 7.60 (q, 2H, J=3.4, 3.2 Hz), 7.29 (d, 2H, J=2.4 Hz), 1.53 (s, 18H), 1.36 (s, 18H). $^{13}$C NMR (CD$_2$Cl$_2$): δ. 164.7 (CH=N), 163.8, 143.1, 141.9, 135.2, 133.0, 132.0, 130.2, 117.6, 117.3, 36.0, 34.7, 31.4 (CMe$_3$),30.0 (CMe$_3$). $^{119}$Sn NMR (CD$_2$Cl$_2$): δ −720.4. APCIMS (MeCN, found/calcd): m/z 737/737.2 (M—Br$^+$). Anal.: calcd. for C$_{36}$H$_{46}$Br$_2$N$_2$O$_2$Sn.1½CH$_2$Cl$_2$: C, 47.68; H, 5.23; N, 2.97. Found: C, 47.67; H, 5.24; N, 3.12.

(N,N'-bis(3,5-di-tert-butylsalicylidene)-(R,R)-(−)-1,2-cyclo-hexanedlamino)tin(IV)dibromide (4d)

Yellow solid, yield=91%. $^1$H NMR (CD$_2$Cl$_2$): δ 8.15 (s, 2H, J$_{Sn-H}$=43.6 Hz), 7.64 (d, 2H, J=2.8 Hz), 7.16 (d, 2H, J=2.4 Hz), 4.09 (m, 2H), 2.54 (m 2H), 2.08 (m, 2H), 1.62 (b, 4H), 1.48 (s, 18H), 1.33 (s, 18H). $^{13}$C NMR (CD$_2$Cl$_2$): δ 167.5 (CH=N), 163.0, 142.5, 140.9, 132.8, 131.2, 117.3, 61.9, 36.0, 34.7, 31.6 (CMe$_3$), 30.0 (CMe$_3$), 27.0, 24.1, 19.2. $^{119}$Sn NMR(CD$_2$Cl$_2$): δ −711.8. APCIMS(MeCN,found/calcd): m/z 744/743.2 (M—Br$^\rightleftharpoons$). Anal.: calcd. for C$_{36}$H$_{52}$Br$_2$N$_2$O$_2$Sn. CH$_2$Cl$_2$: C, 52.03; H, 6.35; N, 3.36. Found: C, 51.97; H, 6.27; N, 3.40.

(N,N'-bis(3,5-di-tert-butylsalicylidene)-(S,S)-(+)-1,2-cyclo-hexanediamino)tin(IV)dibromide (4e)

Yellow solid, yield=375 mg (90%). $^1$H NMR (CD$_2$Cl$_2$): δ 0.8.16 (s, 2H, J$_{Sn-H}$=43.6 Hz), 7.65 (d, 2H, J=2.0 Hz), 7.17 (d, 2H, J=2.0 Hz), 4.09 (m, 2H), 2.54 (m 2H), 2.08 (m, 2H), 1.5–1.6 (b, 4H), 1.49 (s, 18H), 1.33 (s, 18H). $^{13}$C NMR (CD$_2$Cl$_2$): δ 167.5 (CH=N), 163.0, 142.5, 140.9, 132.8, 131.2, 117.3, 61.9, 36.0, 34.7, 31.6 (CMe$_3$), 30.0 (CMe$_3$), 27.0, 24.1, 19.2. $^{119}$Sn NMR(CD$_2$Cl$_2$): δ −709.7. FABMS (found/calcd): m/z 744/743.2 (M—Br+). Anal.: calcd. for C$_{36}$H$_{52}$Br$_2$N$_2$O$_2$Sn·½CH$_2$Cl$_2$: C, 51.33; H, 6.17; N, 3.24. Found: C, 51.46; H, 6.14; N, 3.25.

Example 19
General Procedure for the Synthesis of 5a–e

To a hexanes (20 cm$^3$) slurry of (Salen)Sn$^{II}$, (1a–e, 0.5 mmol) in a Schlenk flask equipped with a magnetic stir bar was added I$_2$ (127 mg, 0.5 mmol). The reaction mixture was allowed to stir for 18 h and filtered via cannula. The remaining solid product was washed with hexanes (2×10 cm$^3$) and dried under vacuum.

(N,N'-bis(3,5-di-tert-butylsalicylidene)-1,2-ethanediamino)tin (IV)diiodide (5a)

Yellow solid=369 mg (84%). $^1$H NMR (CD$_2$Cl$_2$): δ 8.17 (s, 2H, J$_{Sn-H}$=32.6 Hz), 7.68 (d, 2H, J=2.8 Hz), 7.13 (d, 2H, J=2.8 Hz), 4.16 (s, 4H), 1.49 (s, 18H), 1.34 (s, 18H). $^{13}$CNMR(CD$_2$Cl$_2$): δ 171.0(CH=N), 162.3, 142.7, 141.1, 133.1, 130.7, 117.1, 51.0, 35.9, 34.7, 31.5 (CMe$_3$), 30.2 (CMe$_3$). $^{119}$Sn NMR (CD$_2$Cl$_2$): δ −805.1. FABMS (found/calcd.): m/z737/737.2(M-I$^+$). Anal.: calcd. for C$_{32}$H$_{46}$I$_2$N$_2$O$_2$Sn¼CH$_2$Cl$_2$: C, 43.80, H, 5.30, N, 3.17; Found: C, 43.67, H, 5.31, N, 3.20.

(N,N'-bis(3,5-di-tert-butylsalicylidene)-1-Methyl-1,2-ethane-diamino)tin(IV)diiodide (5b)

Yellow solid, yield=377 mg (86%). $^1$H NMR (400 MHz, CDCl$_3$): δ 8.12 (s, 2H, J$_{Sn-H}$=34.6 Hz), 7.64 (s, 2H), 7.07 (d, 2H, J=4.4 Hz), 4.67 (b, 1H), 4.08 (b, 1H), 3.91 (b, 1H), 1.64 (d, 2H), 1.51 (s, 18H), 1.28 (s, 18H). $^{13}$C NMR (125 MHz, CD$_2$Cl$_2$): δ 170.6 (CH=N), 163.0, 142.9, 142.8, 140.8, 133.1, 132.9, 130.7, 117.0, 56.9, 35.6, 34.4, 31.8, 31.5, 31.4 (CMe$_3$), 30.1 (CMe$_3$). $^{119}$Sn NMR (CD$_2$Cl$_2$): δ −1015.9. FABMS (found/calcd): m/z 751/751.2 (M-I$^+$). Anal.: calcd. for C$_{33}$H$_{48}$I$_2$N$_2$O$_2$Sn.CH$_2$Cl$_2$: C 42.44, H, 5.20; N, 2.91. Found: C, 42.58; H, 5.21; N, 2.92.

(N,N'-bis(3,5-tert-butylsalicylidene)-1,2-benzenediamino)tin (IV)diiodide (5c)

Orange solid, yield=420 mg (92%). $^1$H NMR (CD$_3$OD): δ 9.55 (s, 2H, J$_{Sn-H}$=38.4 Hz), 8.31 (q, 2H), 7.96 (d, 2H, J=2.0 Hz), 7.79 (m, 4H, J=2.0 Hz), 1.62 (s, 18H), 1.47 (s, 18H). $^{13}$C NMR (CD$_3$OD): δ 168.3 (CH=N), 164.8, 144.3, 144.1, 136.4, 134.0, 133.5, 131.8, 119.5, 118.7, 36.7, 31.6 (CMe$_3$), 30.7 (CMc$_3$). $^{119}$Sn NMR (CD$_3$OD): δ −783.8. APCIMS (MeCN, found/calcd): m/z 785/785.2(M-I$^+$). Anal.: calcd. for C$_{36}$H$_{46}$I$_2$N$_2$O$_2$Sn.¼C$_6$H$_{14}$: C, 48.29; H, 5.35; N, 3.00. Found: C, 48.12; H, 35; N, 2.87.

(N,N'-bis(3,5-di-tert-butylsalicylidene)-(R,R)-(−)-1,2-cyclo-hexanediamino)tin(IV)diiodide (5d)

Yellow solid, yield=262 mg (57%). $^1$H NMR (CD$_2$Cl$_2$): δ 8.09 (s, 2H, J$_{Sn-H}$=39.3 Hz), 7.67 (d, 2H, J=2.4 Hz), 7.17 (d, 2H, J=2.4 Hz), 4.25 (b, 2H), 2.56 (m, 2H), 2.09 (m, 2H), 1.6–1.9 (b, 4H), 1.50 (s, 18H), 1.35 (s, 18H). $^{13}$C NMR (CD$_2$Cl$_2$): δ 167.8 (CH=N), 162.6, 142.9, 141.3, 133.2, 131.5, 117.1, 60.8, 35.9, 34.7, 31.5 (CMe$_3$), 30.2 (CMe$_3$), 26.8, 24.0, $^{119}$Sn NMR (CD$_2$Cl$_2$): δ −992.1. APCIMS (MeCN, found/calcd): m/z 791/791.2 (M-I$^+$). Anal.: calcd. for C$_{36}$H$_{52}$I$_2$N$_2$O$_2$Sn.½C$_6$H$_{14}$: C, 48.77; H, 6.30; N, 2.92. Found: C, 48.61; H, 6.11; N, 3.01.

(N,N'-bis(3,5-di-tert-butylsalicylidene)-(S,S)-(+)-1,2cyclo-hexanediamino)tin(IV)dilodide (5e)

Yellow solid, yield=408 mg (89%). $^1$H NMR (CDCl$_3$): δ 8.05 (s, 2H, J$_{Sn-H}$=39.4 Hz), 7.64 (d, 2H, J=2.4 Hz), 7.07 (d, 2H, J=2.4 Hz), 4.25 (b, 2H), 2.57 (m, 2H), 2.11 (m, 2H), 1.66 (m, 4H), 1.52 (s, 18H), 1.33 (s, 18H). $^{13}$C NMR (CDCl$_3$): δ 167.0 (CH=N), 162.4, 142.7, 142.7, 140.5, 132.7, 130.8, 116.7, 60.3, 35.7, 34.5, 31.6 (CMe$_3$), 30.2 (CMe$_3$), 23.8, 23.0. $^{119}$Sn NMR (CD$_2$Cl$_2$): δ −992.1. FABMS (found/calcd): m/z 790/790.4 (M-I$^+$). Anal.: calcd. for C$_{36}$H$_{52}$I$_2$N$_2$O$_2$Sn.¼C$_6$H$_{14}$: C, 48.97; H, 6.01; N, 2.98. Found: C, 48.11; H, 6.05; N, 2.98.

Example 20

General Procedure for the Synthesis of 6a–e

To a $CH_2Cl_2$ solution (20 cm$^3$) of (Salen)Sn(IV) (3a–e, 0.1 mmol) in a Schlenk flask equipped with a magnetic stir bar was added AgOTf (51.4 mg, 0.2 mmol). The reaction mixture was allowed to stir for 12 h and filtered via cannula into another 50-mL Schlenk flask. The filtrate was collected then evaporated in vacuo to give a solid product.

(N,N'-bis(3,5-di-tert-butylsalicylidene)-1,2-ethanediamino) tin (IV)bis(triflate) (6a)

Pale yellow-green solid, yield=430 mg(97%). $^1$H NMR ($CD_2Cl_2$): δ 8.60 (s, 2H, $J_{Sn-H}$=55.2 Hz), 7.78 (d, 2H, J=2.4 Hz), 7.22 (d, 2H, J=2.4 Hz), 4.33 (s, 2H), 1.48 (s, 18H), 1.34 (s, 18H). $^{13}$C NMR ($CD_2Cl_2$): δ 171.8 (CH=N), 163.6, 142.83, 142.75, 134.6, 131.6, 117.1, 63.0, 36.1, 34.8, 31.4 ($CMe_3$), 29.8 ($CMe_3$), 27.2, 23.9. The quartet peak of the triflate carbon was not found. $^{119}$Sn NMR ($CD_2Cl_2$): δ 662.3. $^{19}$F NMR ($CD_2Cl_2$): δ 54.52. APCIMS (MeCN, found/calcd): m/z 760/759.2 (M-OTf$^+$). Anal.: calcd. for $C_{34}H_{46}F_6N_2O_8S_2Sn$·½$CH_2Cl_2$: C, 44.14; H, 5.05; N, 3.02. Found: C, 44.37; H, 5.11; N, 3.07.

(N,N'-bis(3,5-di-tert-butylsalicylidene)-1-Methyl-1,2-ethane-diamino)tin(IV)bis(triflate) (6b)

Pale yellow-green solid, yield=364 mg (79%). $^1$H NMR ($CDCl_3$): δ 8.53 (d, 2H, $J_{SnH}$=56.2 Hz, 54.4 Hz), 7.74 (s, 2H), 7.15 (d, 2H, J=11.2 Hz), 4.56 (b, 1H), 4.16 (b, 2H), 1.70 (d, 3H, J=4.0 Hz), 1.50 (s, 18H), 1.34 (s, 18H). $^{13}$C NMR ($CD_2Cl_2$): δ 174.8 (CH=N), 172.8 (CH=N), 163.9, 163.3, 142.8, 142.4, 134.6, 134.4, 131.3, 130.8, 120.5, 117.3, 117.0, 116.8, 57.1, 54.9, 35.9, 34.6, 31.4 ($CMe_3$), 29.7 ($CMe_3$), 16.8. The quartet peak of the triflate carbon was not found. $^{119}$Sn NMR ($CD_2Cl_2$): δ 659.8. $^{NMR\,(CD}Cl_2$): δ 55.1. APCIMS (MeCN, found/calcd): m/z 773/773.2 (M-OTf$^+$). Anal.: calcd. for $C_{35}H_{48}F_6N_2O_8S_2Sn$·1¼$CH_2Cl_2$: C, 43.38; H, 5.03; N, 2.79. Found: C, 43.41, H, 5.40, N, 2.84.

(N,N'-bis(3,5-tert-butylsalicylidene)-1,2-benzenediamino) tin (Iv)bis(triflate) (6c)

Pale yellow-green solid, yield=344 mg (72%). $^1$H NMR ($CD_2Cl_2$): δ 9.11 (s, 2H, $J_{Sn-H}$=56.0 Hz), 7.92 (q, 2H, J=3.2 Hz), 7.88 (d, 2H, J=2.4 Hz), 7.40 (d, 2H, J=2.0 Hz), 1.53 (s, 18H), 1.37 (s, 18H). $^{13}$C NMR ($CDCl_3$): δ 165.8 (CH=N), 164.7, 143.1, 142.2, 136.4, 135.4, 132.2, 131.8, 130.1, 129.9, 117.3, 117.2, 116.5, 116.3, 35.8, 34.5, 31.2 ($CMe_3$), 29.8 ($CMe_3$). The quartet peak of the triflate carbon was not found. $^{119}$Sn NMR ($CD_2Cl_2$): δ -652.9. $^{19}$F NMR ($CD_2Cl_2$): δ 54.42. APCIMS (MeCN, found/calcd): n/Z 807/807.2 (M-OTf$^+$). Anal.: calcd. for $C_{38}H_{46}F_6N_2O_8S_2Sn$·¾$CH_2Cl_2$: C, 45.66; H, 4.70; N, 2.75. Found: C, 45.32; H, 5.03; N, 2.80.

(N,N'-bis(3,5-di-tert-butylsalicylidene)-(R,R)-(−)-1,2-cyclo-hexanediamino)tin(IV)bis(triflate) (6d)

Pale yellow-green solid, yield=361 mg (75%). $^1$H NMR ($CDCl_3$): δ 8.42 (s, 2H, $J_{Sn-H}$=60.0 Hz), 7.72 (s, 2H), 7.15 (d, 2H), 4.05 (b, 2H), 2.69 (m, 2H), 2.17 (m, 2H), 1.62 (b, 4H), 1.49 (s, 18H), 1.34 (s, 18H). $^{13}$C NMR ($CDCl_3$): δ 171.5 (CH=N), 163.8, 142.9, 142.5, 134.4, 131.3, 116.8, 62.5, 35.8, 34.5, 31.3 ($CMe_3$), 29.6 ($CMe_3$), 26.8, 23.5. The quartet peak of carbon of triflate was not found. $^{119}$Sn NMR ($CD_2Cl_2$): δ -663.5. $^{19}$F NMR ($CD_2Cl_2$): δ 55.09. APCIMS (McCN, found/calcd): m/z 813/812.6 (M-OTf$^+$).

(N,N'-bis(3,5-di-tert-butylsalicylidene)-(S,S)-(+)-1,2-cyclo-hexanediamino)tin(IV) bis(triflate) (6e)

Pale yellow-green solid, yield=313 mg (65%). $^1$H NMR ($CD_2Cl_2$): δ 8.09 (s, 2H, $J_{Sn-H}$=60.2 Hz), 7.67 (d, 2H, J=2.4 Hz), 7.17 (d, 2H, J=2.4 Hz), 4.25 (b, 2H), 2.56 (m, 2H), 2.09 (m, 2H), 1.6–1.9 (b, 4H), 1.50 (s, 18H), 1.35 (s, 18H). $^{13}$C NMR ($CD_2Cl_2$): δ 167.8 (CH=N), 162.6, 142.9, 141.3, 133.2, 131.5, 117.1, 60.8, 35.9, 34.7, 31.5 ($CMe_3$), 30.2 ($CMe_3$), 26.8, 23.2. The quartet peak of the triflate carbon was not found. $^{119}$Sn NMR ($CD_2Cl_2$): δ 661.5. $^{19}$F NMR ($CD_2Cl_2$): δ 54.53. APCIMS (MeCN, found/calcd): mn/z 813/812.6 (M-OTf$^+$). Anal.: calcd. for $C_{38}H_{52}F_6N_2O_8S_2Sn$·½$CH_2Cl_2$: C, 47.46; H, 5.45; N, 2.91. Found: C, 47.34; H, 5.40; N, 2.88.

Example 21

(N,N'-bis(3,5-di-tert-butylsalicylidene)-1,2-ethanediamino) tin (IV) bromide triflate (7a)

To a $CH_2Cl_2$ solution (20 mL) of (Salen)Sn$^{IV}$Br$_2$ 3a (154 mg, 0.2 mmol) in a 50-mL Schlenk flask equipped with a magnetic stir bar was added AgOTf (51.4 mg, 0.2 mmol). The reaction mixture was allowed to stir for 12 h and filtered via cannula into another 50-mL Schlenk flask. The filtrate was collected then evaporated in vacuo to give a yellow solid product, yield=145 mg (86%). $^1$H NMR ($CD_2Cl_2$): δ 8.43 (s, 2H, $J_{Sn-H}$=47.0 Hz), 7.72 (d, 2H, J=2.0 Hz), 7.17 (d, 2H, J=1.6 Hz), 4.22 (m, 2H), 1.49 (s, 18H), 1.33 (s, 18H). $^{13}$CNMR($CD_2Cl_2$): δ 173.5 (CH=N), 163.4, 142.8 142.0, 133.8, 130.9, 117.4, 51.8, 36.1, 34.7, 31.5 ($CMe_3$), 29.9 ($CMe_3$). The quartet peak of the triflate carbon was not found. $^{119}$Sn NMR($CD_2Cl_2$): δ -662.6. $^{19}$F NMR($CD_2Cl_2$): 853.99. APCIMS (MeCN, found/calcd): m/z 689/689.2(M-OTf$^+$). Anal.: calcd. for $C_{33}H_{46}BrF_3N_2O_5SSn$: C, 47.27; H, 5.53; N, 3.34. Found: C, 47.49; H, 5.51 N, 3.35.

Example 22

General Procedure for the Synthesis of 3a, 3e, 5a, and 5e from 6a and 6e

To a $CH_2Cl_2$-THF solution (1:1.5 v/v, 15 cm$^3$) of (salen)Sn(OTf)$_2$ (5a or 5e, 0.3 mmol) in a Schlenk flask equipped with a magnetic stir bar was added either NaCl or NaI (5 equiv). The reaction mixture was allowed to stir for 18 h and then hexanes (15 cm$^3$) was added into the mixture, stired for an additional 10 h, and filtered via cannula into another 50-mL Schlenk flask. The filtrate was collected and evaporated in vacuo to give a solid product which is washed with hexanes (2×10 cm$^3$). Yield for 3a 90%. Yield for 3e=87%. Yield for 5a=90%. Yield for 5e=80%.

Example 23

Synthesis of 5a from 4a

To a $CH_2Cl_2$ solution (10 cm$^3$) of (salen)SnBr$_2$ (4a, 0.3 mmol) in a 50-nL Schlenk flask equipped with a magnetic stir bar was added NaI (225 mg, 1.5 mmol). The reaction mixture was allowed to stir for 28 h and filtered via cannula into another Schlenk flask. The filtrate was collected and then evaporated in vacuo to give a solid product which was washed with hexanes (2×10 cm$^3$). Yield for 5a=82%.

III. Examples 24–34

Example 24

General information. All $^1$H NMR and $^{13}$C NMR were taken on Mercury 400, or INOVA 500 NMR machines. All elemental analysis was performed by Atlantic Microlab Inc. All masses were taken on a Mettler Toledo Analytical Balance. EtOH was purchased from Pharmco. Salicylaldehydes, amines, and propylene oxide where purchased from Aldrich and used as received. Solvents were purchased from EM Science and were dried by distillation methods.

Example 25

General procedure for synthesis of Schiff bases. Solid reactants were weighed into a vial and where introduced into a two-necked flask, and were dissolved in the minimum of EtOH. The liquid reactants were weighed in a vial and introduced into a two-necked flask, the vial was rinsed three times with EtOH to ensure quantitative transfer. The flask was equipped with a water-cooled condenser, and a septum over the other opening. The reaction was heated to reflux with stirring. EtOH was removed via RotoVap until constant weight was obtained.

Example 26

Synthesis of compound a. 1.2827 g (6.648 mmol) 3,5-dichloro 2-hydroxybenzaldehyde, 0.8361 g (6.648 mmol) R-1(1cyclohexyl)ethylamine dissolved in 20 mL EtOH. Reaction was heated for 12 hours. Product was yellow, viscous liquid. $^1$H NMR showed residual solvent, so the product was further dried under high vacuum for 24 hours. $^1$H NMR (CDCl$_3$): δ 0.949–1.763(m, 11H, J=2.5 Hz, cyclohexyl), 1.307, 1.294 (d, 3H, J=6.5 Hz, CH$_3$), 3.245, 3.233, 3.220 (t, 1H, J=6 Hz, CH—CH$_3$), 7.134, 7.129 (d, 1H, J=2.5 Hz, Ar), 7.415, 7.420 (d, 1H, J=2.5 Hz, Ar), 8.150 (s, 1H, CH=N), 15.029 (s, 1H, OH). $^{13}$C NMR (CDCl$_3$): δ 19.578, 26.262, 26.339, 26.415, 29.040, 29.817, 43.686, 68.567, 118.537, 121.322, 124.028, 129.094, 132.708, 159.831, 161.589.

Example 27

Synthesis of compound b. 3.074 g (20 mmol) o-vanillin, 2.5965 g (20 mmol) R-1(1-cyclohexyl)ethylamine in 25 mL EtOH, reflux 12 hours. Yellow, viscous, liquid. $^1$H NMR revealed residual EtOH, removed under high vacuum for 24 hours. Yield, 4.9184 g, 94%. $^1$H NMR (CDCl$_3$): δ 0.990–1.741 (m, 11H, cyclohexyl), 1.249, 1.261 (d, 3H, J=6.0 Hz, OCH$_3$), 3.143, 3.156, 3.169 (t, 1H, J=6.5 Hz, CH—CH$_3$), 6.756, 6.762, 6.778 (t, 1H, J=8 Hz, Ar), 6.850, 6.866, 6.884, 6.900 (m, 2H, J=8 Hz, Ar), 8.244 (s, 1H, CH=N), 14.529 (s, 1H, OH). $^{13}$C NMR (CDCl$_3$): δ 19.824, 26.368, 26.441, 26.530, 28.853, 28.953, 43.864, 56.112, 69.174, 113.572, 117.390, 118.278, 122.805, 148.938, 153.524, 162.757.

Example 28

Synthesis of compound c. 1.4165 g (10.03 mmol) 2-hydroxyacetophenone, 1.3107 g (10.03 mmol) 20 mL EtOH, refluxed for 48 hours. $^1$H NMR revealed residual EtOH, solvent removed under high vacuum for 24 hours. Yield, 2.2998g, 91%. $^1$H NMR (CDCl$_3$): δ 0.788–1.618 (m, 11H, Cyclohexyl), 1.004, 1.017 (d, 3H, J=6.5 Hz, CH$_3$), 2.143 (s, 3H, Carbonyl CH$_3$), 6.495, 6.509, 6.526 (t, 1H, J=8.5 Hz, Ar), 6.685, 6.702 (d, 1H, J=8.5 Hz, Ar), 7.045, 7.059, 7.074 (t, 1H, J=7 Hz, Ar), 17.010 (s, 1H, OH). $^{13}$C NMR (CDCl$_3$): δ 14.007, 19.043, 26.458, 26.470, 29.294, 29.825, 44.221, 58.880, 116.379, 118.859, 119.662, 128.206, 132.801, 166.099, 169.657.

Example 29

Synthesis of compound d. 1.2461 g (10 mmol) salicylaldehyde, 1.7475 g (10 mmol) 1(1-napthyl) ethylamine, and 20 mL EtOH, reflux 24 hours. $^1$H NMR revealed residual starting material, recrystalization in EtOH performed. Dried on suction filter 12 hours. Yield, 2.4822 g, 91%. $^1$H NMR (CDCl$_3$): δ 1.823, 1.835 (d, 3H, J=6 Hz, CH$_3$), 5.422, 5.434, 5.446, 5.458 (quartet, 1H, J=6 Hz, CH—CH$_3$), 6.889 (s, 1H, Ar), 7.029 (s, 1H, Ar), 7.219, 7.233 (d, 1H, J=7 Hz, Ar), 7.346 (s, 1H, Ar), 7.352, 7.536, 7.562, 7.579, 7.591 (m, 3H, Ar), 7.682 (s, 1H, Ar), 7.821 (s, 1H, Ar), 7.922 (s, 1H, Ar), 8.172 (s, 1H, Ar), 8.464 (s, 1H, CH=N), 13.761 (s, 1H, OH). $^{13}$C NMR (CDCl$_3$): δ 24.636, 64.185, 117.036, 118.697, 118.939, 123.121, 123.921, 125.635, 125.707, 126.260, 127.894, 129.145, 130.426, 131.537, 132.364, 133.986, 139.423, 161.036, 163.769.

Example 30

Synthesis of compound e. 1.1835 g (5.05 mmol) 3,5-ditertbutyl-2-hydroxybenzaldehyde, 0.8740 g (5.05 mmol) 1(1-napthyl)ethylamine, 30 mL EtOH, reflux 12 hours. $^1$H NMR shows residual starting products, recrystalization is performed. Dried on vacuum filter funnel 12 hours. $^1$H NMR (CDCl$_3$): 1.306 (s, 9H, t-Bu), 1.505 (2, 9H, t-Bu), 1.806, 1.823 (d, 3H, J=6.8 Hz, CH$_3$), 5.411, 5.427, 5.444, 5.460 (q, 1H, J=6.8 Hz, CH—CH$_3$), 7.062, 7.067 (d, 1H, J=2.5, Ar), 7.410, 7.414 (d, 1H, J=1.6 Hz, Ar), 7.504–7.594 (m, 6H, Ar), 7.695, 7.712 (d, 1H, J=6.8 Hz, 7.802, 7.823 (d, 1H, J=8.4, Ar), 7.906, 7.925 (d, 1H, J=7.6 Hz, Ar), 8.155, 8.176 (d, 1H, J=8.4 Hz, Ar), 8.481 (s, 1H, CH=N), 14.040 (s, 1H, OH). $^3$C NMR (CDCl$_3$): δ 24.830, 29.796, 34.429, 35.373, 63.999, 118.068, 123.208, 124.061, 125.600, 125.790, 126.199, 126.249, 127.071, 127.792, 129.126, 130.563, 133.982, 136.704, 139.7222, 140.109, 158.071, 164.948. Elemental Analysis: Calc: C=83.68, H=8.58, N=3.61, Found: C=83.53, H=8.61, N=3.65.

Example 31

General procedure for synthesis of Co(II) complex. Ligand was weighed in a vial, introduced to a Schlenk flask, dissolved in THF or diethyl ether, and NEt$_3$ was added via syringe. This was stirred for five minutes at room temperature to allow for deprotonation. CoCl$_2$ was weighed in a vial, and introduced to the reaction mixture. The flask was purged with N$_2$ and sealed with a septum, the reaction was heated to 50° C. and allowed to react for 12 hours with stirring. The solvent was then removed via Schlenk technique, and the product was dissolved in diethyl ether or toluene and transferred via cannula filter to an awaiting Schlenk flask. The solvent was then removed via Schlenk technique again. This was repeated until no salts were left in the product solution.

Example 32

Synthesis of compound f. 1.6723 g (4.3 mmol) compound 5, 0.2900g (2.2 mmol) CoCl$_2$, 0.7 mL(4.3 mmol) NEt$_3$ and 25 mL diethyl ether were combined in described manner. Diethyl ether was used to dissolve product for extraction. Yield, 1.687 g (94%). Elemental analysis: Calc: C=77.95, H=7.75, N=3.37, Found: C=77.79, H=7.78, N=3.39.

Example 33

Synthesis of compound g. 1.8730 g (6.8 mmol) compound 4, 0.4500 g (3.4 mmol) CoCl$_2$, 1 mL NEt$_3$, and 25 mL THF were combined. Successive dissolutions in toluene and diethyl ether were used for extraction. Yield, 0.8681 g (42%). Elemental analysis: Calc: C=75.12, H=5.31, N=4.61, Found: C=75.24, H=5.30, N=4.61.

Example 34

General procedure for synthesis of Co(III) complexes. Co(II) complexes were weighed in a vial and added to Schienk flask, half equivalent of 12 was weighed and added to same Schlenk flask. The solids were dissolved in minimum CH$_2$Cl$_2$, and flask was purged with N$_2$. Stirring bar was inserted. Stirred on squid at room temperature for 12 hours. Solvent was removed via Schlenk technique. Excess 12 was removed via sublimation under high vacuum for 24 hours.

Example 35

Synthesis of compound 8. 0.4341 g (0.7 mmol) compound 7, 0.396 g(0.4 mmol) $I_2$, 10 mL $CH_2Cl_2$ were combined in the prescribed manner. Product was orange powder. $^1H$ NMR (DMSO): δ 2.108, 2.115 (d, 6H, J=3.5 Hz, $CH_3$), 5.960, 5.972 (d, 2H, J=6 Hz, CH—$CH_3$), 7.143–8.691 (m, 22H, Ar), 9.190, 9.227 (d, 2H, J=18.5 CH=N).

Example 36

Synthesis of compound 9. 0.4160 g (0.5 mmol) compound 6, 0.0700 g (0.25 mmol) $I_2$, and 10 mL $CH_2Cl_2$ were combined in the described manner. Yield, 0.3332 g (70%) orange powder. $^1H$ NMR (DMSO): δ 1.665 (s, 18H, t-Bu), 1.789 (s, 18H, tBu), 2.127 (s, 6H, $CH_3$), 3.771 (s, 2H, CH—$CH_3$), 7.698–8.918 (m, 18H, Ar) 9.230 (s, 2H, CH=N).

Example 37

Synthesis of compound 10. 0.3295 g (0.5 mmol) compound 7, 0.0700 g (0.3 mmol) 12, 0.1330 g (1.1 mmol) 4-dimethylaminopyridine, 10 mL $CH_2Cl_2$ were combined in the described manner. Yield, 0.5546 g(l 18%) green crystals. $^1H$ NMR ($CD_2Cl_2$): δ 1.605 (s, 6H, $CH_3$), 1.862 (s, 3H, $CH_3$), 2.378 (s, 3H, $CH_3$), 2.627 (s, 3H, $CH_3$), 2.967 (s, 3H, $CH_3$), 4.438 (t, 1H, CH—$CH_3$), 6.324–7.911 (m, 30H, Ar), 8.091 (s, 2H, CH=N).

Example 38

Synthesis of compound 11. 0.3000 g (0.361 mmol) compound 6, 0.0458 g (0.180 mmol), 0.0881 g (0.721 mmol) 4-dimethylaminopyridine were combined in the prescribed manner. Black crystals were formed.

Example 39

General procedure for synthesis of cyclic propylene carbonate. Co(III) catalyst was weighed in a vial and placed in the bomb, it was dissolved in $CH_2Cl_2$. 4-dimethylaminopyridine co-catalyst(if used) was weighed in the same manner, and dissolved with the Co(III) catalyst. 5 mL of propylene oxide was added to the bomb via syringe. The pressure head was attached, and the stem was purged with pressurized $CO_2$ three times. The bomb cavity was then purged with pressurized $CO_2$ three times. The bomb was heated in an oil bath with stirring. To stop the reaction the bomb was removed from heat, and cooled with running water. The pressure was then released in the hood, and the head was removed. The liquids and solids left in the bomb were transferred to a tared round bottom flask. The bomb was rinsed three times with $CH_2Cl_2$, the rinsings were also transferred to the round bottom flask. The excess $CH_2Cl_2$ and propylene oxide was removed via RotoVap. The product with catalyst was a brown green color. The mass of the catalyst and co-catalyst (if used) were subtracted from the weight of product.

IV. Examples 40–48

Example 40

Figure 16:
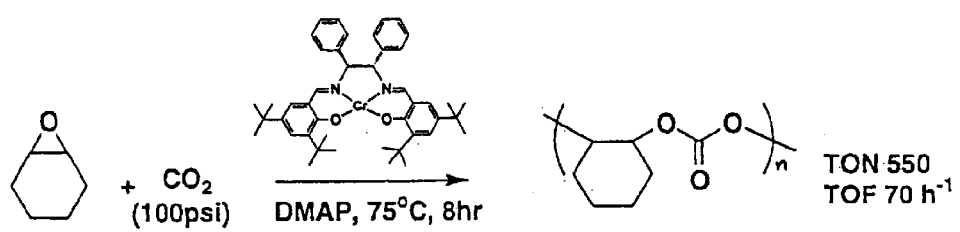
FIG. 16. Schematic illustration of polycarbonate preparation, in accordance with this invention.

As discussed more fully above, various catalytic materials of this invention can be used in a preparation of polycarbonate compositions. Illustrating such use and with reference to FIG. 16, cyclohexene oxide is coupled with carbon dioxide at low pressures and temperatures, both efficiently and at good turnover number and turnover frequency.

Example 41

Figure 17:
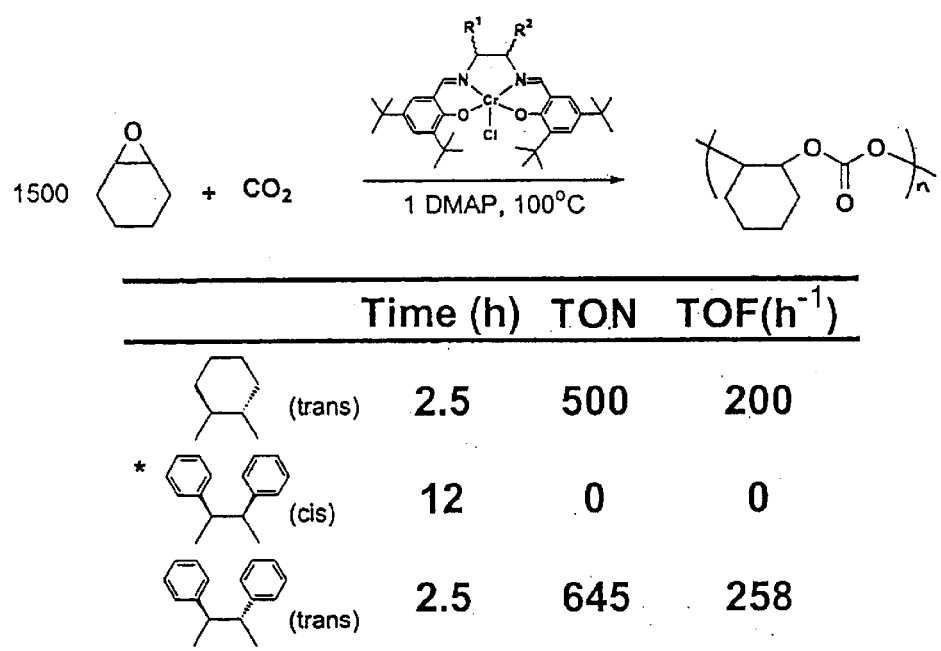
FIG. 17. Effect of ligand substituent stereochemistry on catalytic activity.

Using one metal-ligand complex of this invention, choice of ligand substituent stereochemistry can be used to affect and/or enhance catalytic activity. As shown in FIG. 17, observed activities and carbonate production vary upon choice of epoxide substrates and ligand stereochemistry.

Example 42

Figure 18:
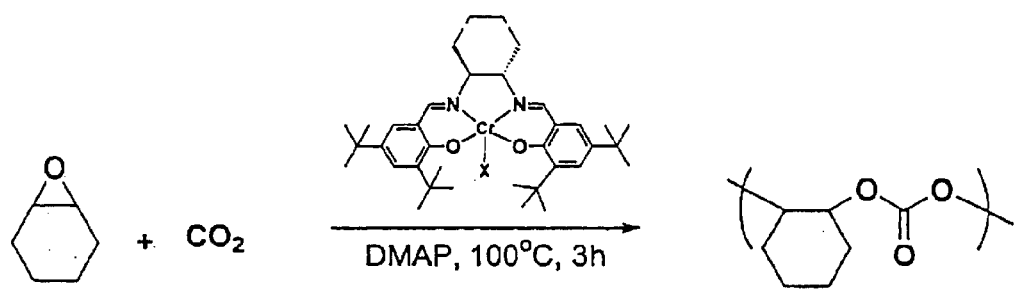
FIG. 18. Effect of counter-anion on catalytic activity in the preparation of a representative polycarbonate.

Referring to FIG. 18, the results of this example show choice of counter-anion can be used to affect and/or enhance catalytic activity, in the context of polycarbonate production.

Example 43

Figure 19:
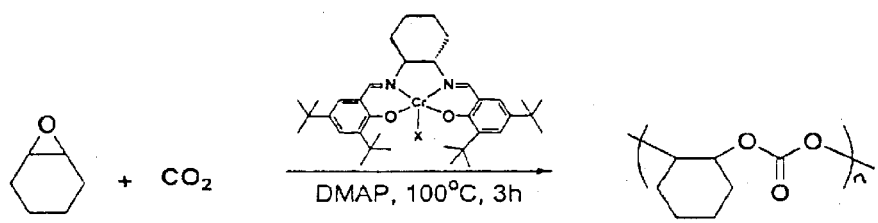
FIG. 19. Effect of counter-anion on polycarbonate formation, as further influenced by the presence of a cocatalyst.

With reference to FIG. 19 and the preceding example, catalytic activity from one counter-anion to another, also varies with the presence of a cocatalytic material. For purposes of illustration, the referenced reaction was run without a preferred DMAP cocatalyst, resulting in decreased activity for each catalytic system/anion tested. Most striking are the results obtained using chloride anion absent DMAP.

Example 44

Figure 20:
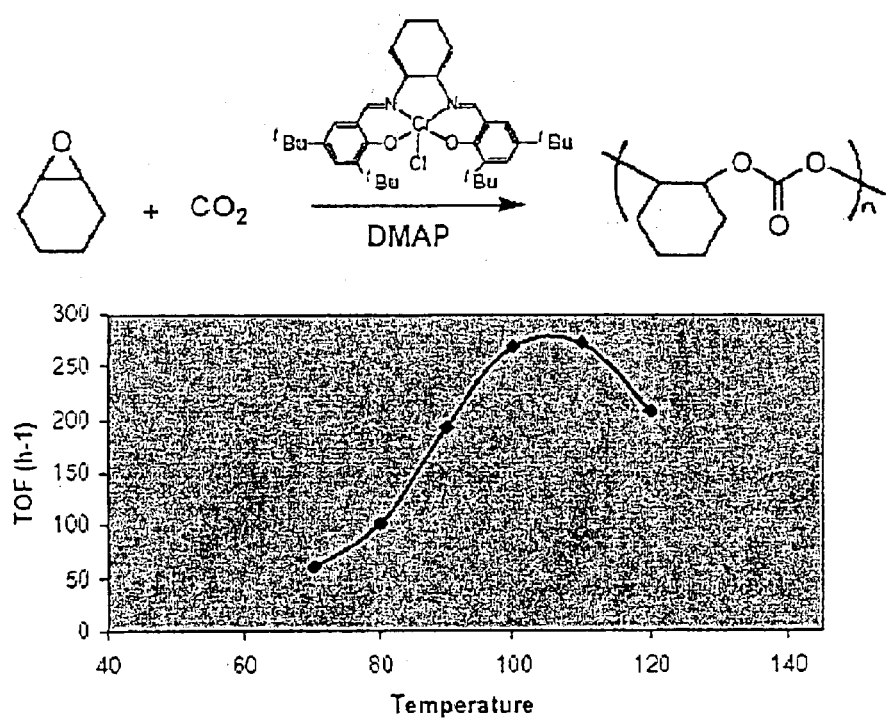
FIG. 20. Catalytic activity and polycarbonate production under mild temperature conditions.

Temperature has an effect on catalytic activity, in terms of turnover frequency, as shown by the data presented above. Mild temperatures can be employed, as demonstrated with this representative polymerization system, but are also available using other substrates and catalytic complexes. Reference is made to FIG. 20.

Example 45

Figure 21:
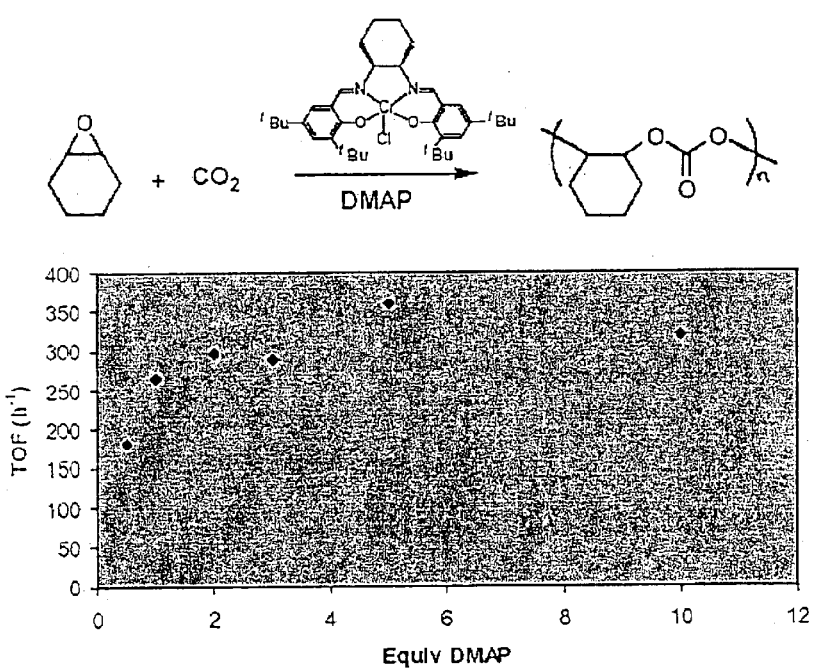
FIG. 21. Effect of cocatalyst concentration on catalytic activity and polycarbonate production.

Unlike various other embodiments of this invention (cyclic carbonate production), there appears no decrease in catalytic activity upon increasing cocatalyst concentration. While this effect is demonstrated using a preferred DMAP component, various other cocatalytic materials can be employed with good effect. Reference is made to FIG. 21.

Example 46

Figure 22:
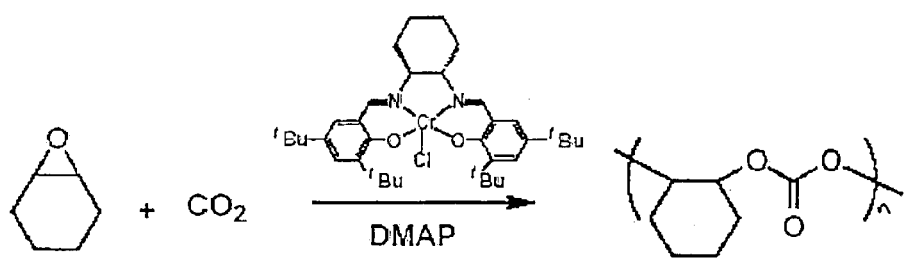
FIG. 22. Effect of multiple reaction parameters on polycarbonate production and resulting polydispersity.

The reaction of this example (see, FIG. 22) illustrates, without limitation, preparation of polycarbonate compositions, as demonstrated using a representative metal-ligand complex. Various reaction parameters are explored enroute to isolation of polymeric compositions having a polydispersity index less than 2.

Example 47

Figure 23:
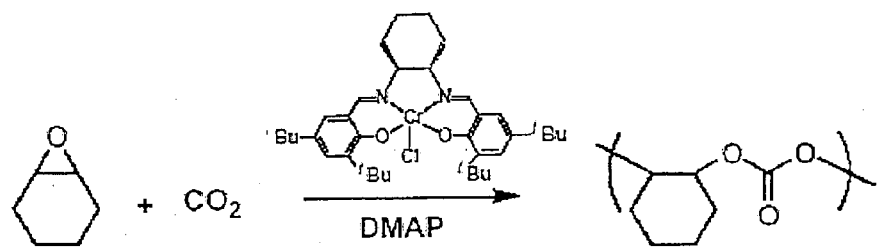
FIG. 23. Effect of carbon dioxide pressure on catalytic activity and polycarbonate production.
Figure 23:
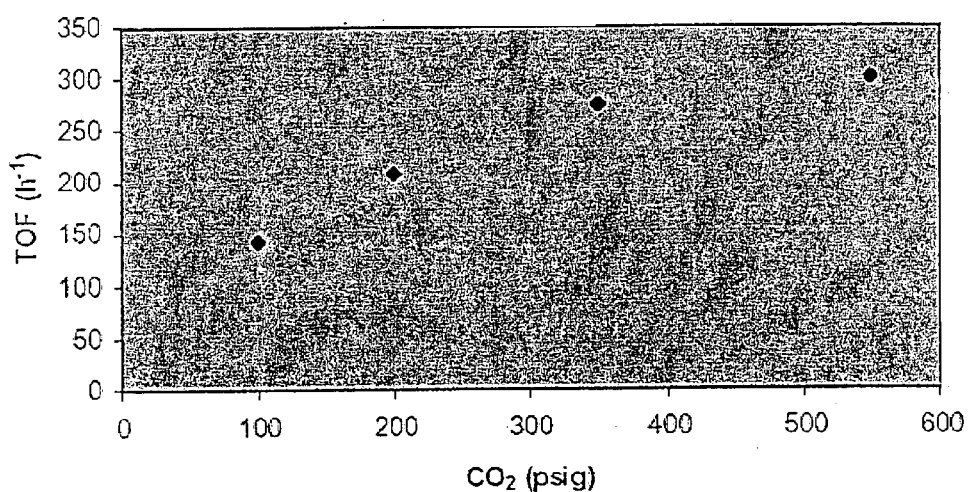

The date of this example (see FIG. 23) shows increased catalytic activity with higher carbon dioxide pressures. Nonetheless, good results are obtainable at pressures well below those of the prior art.

Example 48

Figure 24:
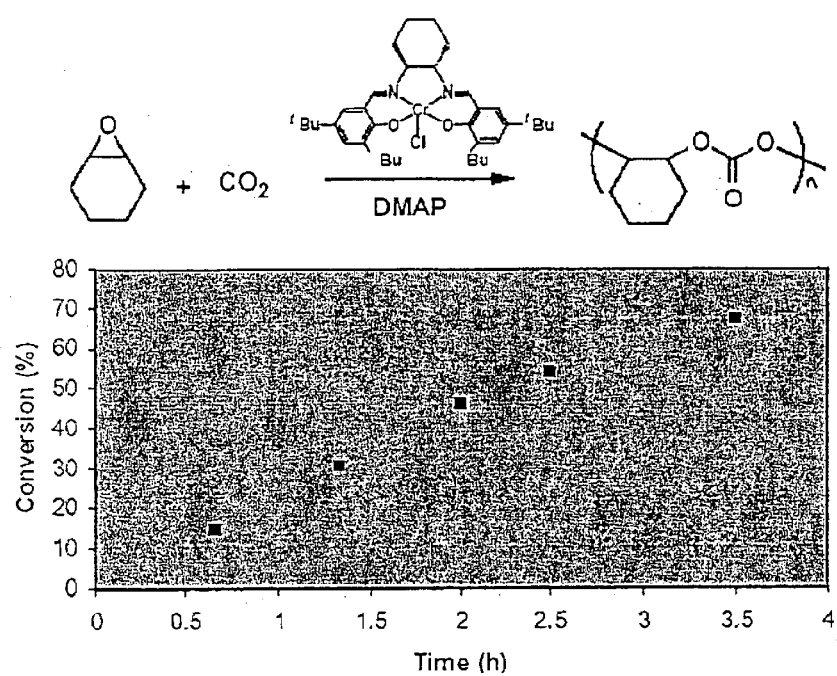
FIG. 24. Graphic representation showing catalyst life and productivity, as demonstrated by a representative metal-ligand complex of this invention.

The data of this example (see FIG. 24) shows the metal-ligand complexes of this invention to have extended life and good productivity. Comparable results are available using various other catalytic complexes, as described elsewhere herein.

What is claimed is:

1. A method of using a metal-ligand complex to prepare a polycarbonate compound having a low polydispersity index, said method comprising:
   providing an epoxide substrate;
   admixing a metal-ligand complex with said substrate, said complex having the structural formula

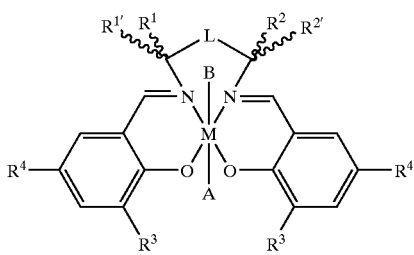

wherein R', R", $R^2$, and $R^{2'}$ are independently selected from the group consisting of hydrogen, methyl, alkyl, substituted alkyl, phenyl, aryl, substituted phenyl, substituted aryl;

wherein L is a linker moiety $(CR^5R^6)_n$ where n=0–4 and $R^5$ and $R^6$ are selected from the group consisting of hydrogen, methyl, alkyl, substituted alkyl, phenyl, aryl, substituted phenyl, substituted aryl and combinations of said moieties;

wherein A and B are ligands selected from the group consisting of neutral ligands, anionic ligands and a combination thereof, said selection determined by the oxidation state of M, and wherein A and B are optionally present, and A and B are independently selected from the group consisting of Cl, OAc, $NO_3$, p-$CH_3SO_3$, $BF_4$, $O_4Cl$, $CF_3SO_3$, $SbF_6$, and a combination thereof, and wherein M is a metal selected from the group consisting of Co, Cr, Fe, Ni, Ti, Cu, Zn, Sn and Al.

wherein $R^3$ is selected from the group consisting of hydrogen, alkyl, substituted alkyl, phenyl, aryl, substituted phenyl, substituted aryl, alkoxy, halide and nitro moieties; and wherein $R^4$ is selected from the group consisting of hydrogen, alkyl, substituted alkyl, phenyl, aryl, substituted phenyl, substituted aryl, alkoxy, halide, and nitro moieties, introducing gaseous carbon dioxide to said substrate and complex admixture; and isolating a polycarbonate composition as the reaction product of said substrate and carbon dioxide.

2. The method of claim 1 wherein the polycarbonate has a polydispersity index less than or equal to 2.

3. The method of claim 1 wherein a Lewis base co-catalyst is introduced to one of said substrate, said complex and said admixture.

4. The method of claim 3 wherein said Lewis base is selected from the group consisting of phosphines, phosphine oxides, phosphites, amines, amine-N-oxides, imidazoles, pyridines, pyridine-N-oxides, ethers, and thioethers.

5. The method of claim 1 wherein said substrate is selected from the group of terminal epoxides consisting of ethylene oxide, propylene oxide, hexene oxide, styrene oxide, epichlorohydrin, butadiene monoxide, and $C_5$–$C_6$ cycloalkene oxides.

6. The method of claim 5 wherein said substrate is cyclohexene oxide.

7. The method of claim 5 wherein said substrate is achiral, said metal-ligand complex has a chiral center and said polycarbonate composition is chiral.

8. The method of claim 1 wherein said admixture is heated.

9. The method of claim 1 further including a solvent in an amount sufficient solubilize said metal-ligand complex.

* * * * *